US012736683B2

(12) United States Patent
Parkins et al.

(10) Patent No.: US 12,736,683 B2
(45) Date of Patent: Sep. 15, 2026

(54) SYSTEM AND METHOD FOR GNSS CORRECTION MONITORING

(71) Applicant: Swift Navigation, Inc., San Francisco, CA (US)

(72) Inventors: Alex Parkins, San Francisco, CA (US); Isak Tjernberg, San Francisco, CA (US); Rodrigo Reichert, San Francisco, CA (US); Fergus MacPherson Noble, San Francisco, CA (US); Sébastien Carcanague, San Francisco, CA (US); Philippe Brocard, San Francisco, CA (US)

(73) Assignee: Swift Navigation, Inc., San Francisco, CA (US)

(*) Notice: Subject to any disclaimer, the term of this patent is extended or adjusted under 35 U.S.C. 154(b) by 350 days.

(21) Appl. No.: 18/503,662

(22) Filed: Nov. 7, 2023

(65) Prior Publication Data

US 2024/0151856 A1 May 9, 2024

Related U.S. Application Data

(60) Provisional application No. 63/423,277, filed on Nov. 7, 2022.

(51) Int. Cl.
*G01S 19/08* (2010.01)
*G01S 19/07* (2010.01)

(52) U.S. Cl.
CPC .............. *G01S 19/08* (2013.01); *G01S 19/07* (2013.01)

(58) Field of Classification Search
CPC .................................. G01S 19/08; G01S 19/07
See application file for complete search history.

(56) References Cited

U.S. PATENT DOCUMENTS

| | | | |
|---|---|---|---|
| 5,451,964 | A | 9/1995 | Babu |
| 5,490,076 | A | 2/1996 | Rawicz et al. |
| 5,610,614 | A | 3/1997 | Talbot et al. |
| 5,825,326 | A | 10/1998 | Semler et al. |
| 5,867,411 | A | 2/1999 | Kumar |
| 5,935,196 | A | 8/1999 | Brodie et al. |

(Continued)

FOREIGN PATENT DOCUMENTS

| | | | |
|---|---|---|---|
| AU | 2007300586 | A1 | 4/2008 |
| CA | 2718988 | C | 1/2014 |

(Continued)

OTHER PUBLICATIONS

Walter et al., "Integrity Lessons from the WAAS Integrity Performance Panel (WIPP)," Stanford University, 2003, https://web.stanford.edu/group/scpnt/gpslab/pubs/papers/Walter_IONNTM_2003.pdf (Year: 2003).*

(Continued)

*Primary Examiner* — William Kelleher
*Assistant Examiner* — Noah Yi Min Zhu
(74) *Attorney, Agent, or Firm* — Jeffrey Schox; Randy Mehlenbacher

(57) ABSTRACT

A system can include a computing system and optionally a GNSS receiver. The computing system can include a correction generator, one or more correction checker, one or more correction combiner, a positioning engine, and/or any suitable components. The computing system may be designed to be free from interference between components.

18 Claims, 7 Drawing Sheets

(56) References Cited

U.S. PATENT DOCUMENTS 5,991,691 A 11/1999 Johnson
6,009,376 A 12/1999 Brodie et al.
6,127,968 A 10/2000 Lu
6,205,400 B1 3/2001 Lin
6,278,945 B1 8/2001 Lin
6,317,688 B1 11/2001 Bruckner et al.
6,408,245 B1 6/2002 An et al.
6,424,914 B1 7/2002 Lin
6,427,122 B1 7/2002 Lin
6,453,237 B1 9/2002 Fuchs et al.
6,552,680 B1 4/2003 Barber et al.
6,628,231 B2 9/2003 Mayersak
6,647,340 B1 11/2003 Pemble et al.
6,691,066 B1 2/2004 Brodie
6,727,849 B1 4/2004 Kirk et al.
6,735,264 B2 5/2004 Miller
6,753,810 B1 6/2004 Yang et al.
6,799,116 B2 9/2004 Robbins
6,816,117 B2 11/2004 Fink et al.
6,856,905 B2 2/2005 Pasturel et al.
6,864,836 B1 3/2005 Hatch et al.
7,026,982 B2 4/2006 Toda et al.
7,158,885 B1 1/2007 Janky et al.
7,219,013 B1 5/2007 Young et al.
7,289,061 B2 10/2007 Komjathy et al.
7,292,183 B2 11/2007 Bird et al.
7,298,325 B2 11/2007 Krikorian et al.
7,382,313 B1 6/2008 Goad
7,409,289 B2 8/2008 Coatantiec et al.
7,538,721 B2 5/2009 Vollath et al.
7,692,578 B2 4/2010 Vollath et al.
7,696,922 B2 4/2010 Nicholson et al.
7,746,272 B2 6/2010 Vollath
8,013,789 B2 9/2011 Van et al.
8,027,413 B2 9/2011 Lillo et al.
8,085,190 B2 12/2011 Sengupta et al.
8,089,402 B2 1/2012 Maenpa et al.
8,094,065 B2 1/2012 Henkel
8,134,497 B2 3/2012 Janky et al.
8,193,976 B2 6/2012 Shen et al.
8,255,155 B1 8/2012 Crane et al.
8,368,590 B2 2/2013 Vollath et al.
8,368,591 B2 2/2013 Talbot et al.
8,416,133 B2 4/2013 Hatch et al.
8,447,517 B2 5/2013 Roh
8,510,041 B1 8/2013 Anguelov et al.
8,542,146 B2 9/2013 Vollath
8,587,475 B2 11/2013 Leandro
8,610,624 B2 12/2013 Savoy
8,704,708 B2 4/2014 Vollath
8,704,709 B2 4/2014 Vollath et al.
8,756,001 B2 6/2014 Georgy et al.
8,760,343 B2 6/2014 Milyutin et al.
8,773,303 B2 7/2014 Doucet et al.
8,816,903 B2 8/2014 Sengupta et al.
8,825,456 B2 9/2014 Vasudevan et al.
8,830,121 B2 9/2014 Vollath
8,831,877 B2 9/2014 Anguelov et al.
8,847,820 B2 9/2014 Landau et al.
8,860,609 B2 10/2014 Roh
8,996,311 B1 3/2015 Morin et al.
9,031,782 B1 5/2015 Lemay et al.
9,069,073 B2 6/2015 Ramakrishnan et al.
9,128,176 B2 9/2015 Seeger
9,146,319 B2 9/2015 Leandro
9,182,497 B2 11/2015 Geier et al.
9,244,177 B2 1/2016 Terashima
9,405,012 B2 8/2016 Doucet et al.
9,405,016 B2 8/2016 Yim
9,417,330 B2 8/2016 Revol et al.
9,488,734 B2 11/2016 Davain
9,557,422 B1 1/2017 Miller et al.
9,568,321 B2 2/2017 Bharadwaj et al.
9,576,082 B2 2/2017 Sparks et al.
9,602,974 B2 3/2017 Rudow et al.
9,612,341 B2 4/2017 Large et al.
9,651,667 B2 5/2017 Leandro et al.
9,671,501 B2 6/2017 Leandro et al.
9,709,683 B2 7/2017 Leandro et al.
9,784,844 B2 10/2017 Kana et al.
9,857,474 B2 1/2018 Tan et al.
9,927,530 B2 3/2018 Boyarski
9,933,528 B2 4/2018 Horn et al.
10,018,729 B2 7/2018 Dunik et al.
10,101,464 B2 10/2018 Appleford et al.
10,191,157 B2 1/2019 Dai et al.
10,260,888 B2 4/2019 Takahashi
10,267,924 B2 4/2019 Ramanandan et al.
10,274,606 B1 4/2019 Phan et al.
10,422,885 B2 9/2019 Dai et al.
10,459,593 B2 10/2019 Tiwari et al.
10,564,296 B2 2/2020 Hide et al.
10,578,747 B2 3/2020 Grgich et al.
10,627,527 B2 4/2020 Horn et al.
10,677,933 B1 6/2020 Gavrilets et al.
10,690,775 B2 6/2020 Jokinen
10,802,160 B2 10/2020 Dai et al.
10,809,388 B1 10/2020 Carcanague et al.
10,901,096 B2 1/2021 Thrasher et al.
11,035,961 B2 6/2021 Horn et al.
11,131,774 B2 9/2021 Miya et al.
11,143,762 B2 10/2021 Takahashi et al.
11,156,718 B2 10/2021 Takeda
11,187,813 B2 * 11/2021 Brandl .................... G01S 19/20
11,221,418 B2 1/2022 Sleewaegen et al.
11,237,276 B2 2/2022 Kleeman
11,255,976 B2 2/2022 Strobel et al.
11,259,141 B2 2/2022 Li et al.
11,300,689 B2 4/2022 Noble et al.
11,327,182 B2 5/2022 Zalewski et al.
11,333,772 B2 5/2022 Del Regno et al.
11,378,699 B2 7/2022 Segal et al.
11,422,269 B2 8/2022 Ookubo et al.
11,422,271 B2 8/2022 Talbot et al.
11,480,690 B2 10/2022 Grgich et al.
11,550,067 B2 1/2023 Reimer et al.
11,624,838 B2 4/2023 Fine et al.
11,693,120 B2 7/2023 Angelo et al.
11,733,397 B2 8/2023 Reimer et al.
11,774,602 B1 10/2023 Laine et al.
11,953,608 B2 4/2024 Hamada et al.
12,415,525 B1 9/2025 Automata et al.
2002/0097184 A1 7/2002 Mayersak
2002/0120400 A1 8/2002 Lin
2002/0180641 A1 12/2002 Fink et al.
2003/0081705 A1 5/2003 Miller
2003/0085840 A1 5/2003 Benner et al.
2004/0006424 A1 1/2004 Joyce et al.
2005/0001762 A1 1/2005 Han et al.
2005/0001763 A1 1/2005 Han et al.
2005/0024263 A1 2/2005 Sharpe et al.
2005/0114023 A1 5/2005 Williamson et al.
2005/0203702 A1 9/2005 Sharpe et al.
2006/0074558 A1 4/2006 Williamson et al.
2007/0055445 A1 3/2007 Janky et al.
2007/0120733 A1 5/2007 Vollath et al.
2007/0126629 A1 6/2007 Krikorian et al.
2008/0205521 A1 8/2008 Van
2009/0018772 A1 1/2009 Watanabe et al.
2009/0184869 A1 7/2009 Talbot et al.
2009/0224969 A1 9/2009 Kolb
2009/0243929 A1 10/2009 Sengupta et al.
2009/0262013 A1 10/2009 Vollath
2009/0273511 A1 11/2009 Schroth
2010/0033370 A1 2/2010 Lopez et al.
2010/0164788 A1 7/2010 Ghaida
2010/0164789 A1 7/2010 Basnayake
2010/0207810 A1 8/2010 Terashima
2010/0283675 A1 11/2010 Mcaree et al.
2010/0324822 A1 12/2010 Coatantiec et al.
2011/0050497 A1 3/2011 Maenpa et al.
2011/0090116 A1 4/2011 Hatch et al.
2011/0122022 A1 5/2011 Van et al.
2011/0140959 A1 6/2011 Vollath

(56) References Cited

U.S. PATENT DOCUMENTS

2011/0148698 A1 6/2011 Vollath
2011/0156949 A1 6/2011 Vollath et al.
2011/0187589 A1 8/2011 Gaal et al.
2011/0187590 A1 8/2011 Leandro
2011/0254730 A1* 10/2011 McBurney .............. G01S 19/08 342/357.4
2011/0260914 A1 10/2011 Vollath et al.
2011/0267226 A1 11/2011 Talbot et al.
2011/0316740 A1 12/2011 Waters et al.
2012/0050097 A1 3/2012 Zhang et al.
2012/0112961 A1 5/2012 Sengupta et al.
2012/0146847 A1 6/2012 Janky et al.
2012/0154210 A1 6/2012 Landau et al.
2012/0154214 A1 6/2012 Leandro
2012/0154215 A1 6/2012 Vollath et al.
2012/0173195 A1 7/2012 Opshaug et al.
2012/0176271 A1 7/2012 Dai et al.
2012/0286991 A1 11/2012 Chen et al.
2013/0050020 A1 2/2013 Peck et al.
2013/0099967 A1 4/2013 Ramasubramanian et al.
2013/0099970 A1 4/2013 Lin et al.
2013/0227377 A1 8/2013 Rao et al.
2013/0234885 A1 9/2013 Geier et al.
2013/0251150 A1 9/2013 Chassagne
2013/0265191 A1 10/2013 Ghinamo
2013/0271318 A1 10/2013 Landau et al.
2013/0325328 A1 12/2013 Anguelov et al.
2013/0335264 A1 12/2013 Revol et al.
2014/0002300 A1 1/2014 Leandro et al.
2014/0015712 A1 1/2014 Leandro et al.
2014/0062765 A1 3/2014 Brenner
2014/0062776 A1 3/2014 Ferguson et al.
2014/0077991 A1 3/2014 Bar-Sever et al.
2014/0184442 A1 7/2014 Large et al.
2014/0232592 A1 8/2014 Psiaki et al.
2014/0240172 A1 8/2014 Milyutin et al.
2014/0266876 A1 9/2014 Tan et al.
2014/0288825 A1 9/2014 Czompo et al.
2014/0375495 A1 12/2014 Fleming et al.
2015/0019464 A1 1/2015 Nguyen-Tuong et al.
2015/0168559 A1 6/2015 Salazar et al.
2015/0173037 A1 6/2015 Pijl
2015/0260848 A1 9/2015 Mundt et al.
2015/0270615 A1 9/2015 Neenan
2015/0293230 A1 10/2015 Weed et al.
2015/0293233 A1 10/2015 De Jong
2015/0369924 A1 12/2015 Hedgecock et al.
2016/0011318 A1 1/2016 Cohen
2016/0097859 A1 4/2016 Hansen et al.
2016/0116601 A1 4/2016 Horn et al.
2016/0195617 A1 7/2016 Phatak et al.
2016/0320493 A1 11/2016 Wu et al.
2016/0373263 A1 12/2016 Zaidi et al.
2017/0010936 A1 1/2017 Daoud et al.
2017/0131407 A1 5/2017 Dunik et al.
2017/0192102 A1 7/2017 Wietfeldt
2017/0269216 A1 9/2017 Dai et al.
2017/0269222 A1 9/2017 Dai et al.
2017/0269231 A1 9/2017 Dai et al.
2017/0299730 A1 10/2017 Lie et al.
2017/0299731 A1 10/2017 Lie et al.
2017/0322313 A1 11/2017 Revol et al.
2018/0091939 A1 3/2018 Venkatraman et al.
2018/0113219 A1 4/2018 Wuebbena
2018/0120445 A1 5/2018 Dill
2018/0164442 A1 6/2018 Thrasher et al.
2018/0172838 A1 6/2018 Junker et al.
2018/0180743 A1 6/2018 Hide et al.
2018/0188032 A1 7/2018 Ramanandan et al.
2018/0246217 A1 8/2018 Wuebbena
2018/0252818 A1 9/2018 Sato et al.
2018/0259651 A1* 9/2018 Antoni .................... G01S 19/20
2018/0283882 A1 10/2018 He et al.
2018/0299562 A1 10/2018 Green
2018/0306930 A1 10/2018 Laine et al.
2019/0004180 A1 1/2019 Jokinen
2019/0056510 A1* 2/2019 de Groot ................. G01S 19/20
2019/0078895 A1 3/2019 Ma et al.
2019/0120970 A1 4/2019 Mgen et al.
2019/0154837 A1 5/2019 Noble et al.
2019/0187295 A1 6/2019 Lee et al.
2019/0187298 A1 6/2019 Grgich et al.
2019/0204450 A1 7/2019 Revol
2019/0243001 A1 8/2019 Ookubo et al.
2019/0302274 A1 10/2019 Berntorp et al.
2019/0339396 A1 11/2019 Turunen
2019/0383948 A1 12/2019 Hoeferlin et al.
2020/0025936 A1 1/2020 Zhou et al.
2020/0025937 A1 1/2020 Kroeger et al.
2020/0041654 A1 2/2020 Noble et al.
2020/0041658 A1 2/2020 Laurichesse
2020/0065172 A1* 2/2020 Menzel ................... G01S 19/47
2020/0084586 A1 3/2020 Rydén et al.
2020/0096649 A1 3/2020 Brandl et al.
2020/0158886 A1 5/2020 Segal et al.
2020/0209406 A1 7/2020 Lin et al.
2020/0233056 A1 7/2020 Dolgov et al.
2020/0257002 A1 8/2020 Henkel
2020/0271795 A1 8/2020 Horn et al.
2020/0348422 A1 11/2020 Carcanague et al.
2020/0408926 A1* 12/2020 Carcanague .......... G01S 19/396
2021/0026374 A1 1/2021 Burghardt et al.
2021/0033735 A1 2/2021 Kleeman
2021/0072407 A1* 3/2021 Talbot ..................... G01S 19/44
2021/0116579 A1 4/2021 Rezaei
2021/0141099 A1 5/2021 Gunnarsson et al.
2021/0165104 A1 6/2021 Zalewski et al.
2021/0165111 A1 6/2021 Zalewski
2021/0215831 A1 7/2021 Takeda
2021/0239845 A1 8/2021 Sheret et al.
2021/0248910 A1* 8/2021 Fries ....................... G01S 19/35
2021/0255336 A1 8/2021 Noble et al.
2021/0372793 A1 12/2021 Nikulin et al.
2021/0405213 A1 12/2021 Tuck et al.
2022/0011443 A1 1/2022 De Wilde et al.
2022/0018969 A1 1/2022 Fine et al.
2022/0057523 A1 2/2022 Lee
2022/0058322 A1 2/2022 Brandl et al.
2022/0107427 A1 4/2022 Kleeman et al.
2022/0163677 A1 5/2022 Muthuraman et al.
2022/0171053 A1 6/2022 Park et al.
2022/0283314 A1* 9/2022 Luo ......................... G01S 19/07
2022/0317310 A1 10/2022 He et al.
2022/0397684 A1* 12/2022 Kee ......................... G01S 19/43
2023/0003897 A1* 1/2023 Kilian ..................... G01S 19/20
2023/0026395 A1 1/2023 Reimer et al.
2023/0140535 A1 5/2023 Ma et al.
2023/0184956 A1 6/2023 Cole et al.
2023/0280476 A1 9/2023 Reimer et al.
2025/0284009 A1* 9/2025 Abdelhameed ....... G01S 19/256

FOREIGN PATENT DOCUMENTS

CA 3079279 A1 10/2020
CN 101166995 A 4/2008
CN 103197327 A 7/2013
CN 103760573 A 4/2014
CN 104236522 A 12/2014
CN 104732085 A 6/2015
CN 106338738 A 1/2017
CN 106970404 A 7/2017
CN 107085626 A 8/2017
CN 108196272 A 6/2018
CN 108317949 A 7/2018
CN 108536003 A 9/2018
CN 105629263 B 4/2019
CN 107422354 B 6/2019
CN 110727002 A 1/2020
CN 111272174 A 6/2020
CN 111879545 A 11/2020
CN 109714421 B 8/2021
CN 111624630 B 2/2022
CN 114174850 A 3/2022
DE 102017212603 A1 1/2019

(56) References Cited

FOREIGN PATENT DOCUMENTS

| | | | |
|---|---|---|---|
| DE | 102018202223 | A1 | 8/2019 |
| EP | 0244091 | A2 | 11/1987 |
| EP | 0461557 | B1 | 12/1997 |
| EP | 0940945 | A2 | 9/1999 |
| EP | 1729145 | A1 | 12/2006 |
| EP | 2128841 | A1 | 12/2009 |
| EP | 2602752 | A1 | 6/2013 |
| EP | 1839070 | B2 | 4/2014 |
| EP | 2966477 | A1 | 1/2016 |
| EP | 2995975 | A1 | 3/2016 |
| EP | 3035080 | A1 | 6/2016 |
| EP | 2156214 | B1 | 8/2018 |
| EP | 3627188 | A1 | 3/2020 |
| EP | 3566021 | B1 | 3/2021 |
| EP | 3809208 | A1 | 4/2021 |
| EP | 3828595 | A1 | 6/2021 |
| EP | 3963352 | A1 | 3/2022 |
| KR | 101181990 | B1 | 9/2012 |
| KR | 101446427 | B1 | 10/2014 |
| WO | 02061449 | A1 | 8/2002 |
| WO | 2017046914 | A1 | 3/2017 |
| WO | 2017070732 | A1 | 5/2017 |
| WO | 2018188845 | A1 | 10/2018 |
| WO | 2020214680 | A1 | 10/2020 |
| WO | 2020240307 | A1 | 12/2020 |

OTHER PUBLICATIONS

Stanford, "Chapter 14 Satellite Based Augmentation Systems (SBAS)," 2019, Stanford University GPS Lab, https://web.stanford.edu/group/scpnt/gpslab/pubs/books/Chapter14SBAS.pdf (Year: 2019).*

Engler et al., "Exokernel: An Operating System Architecture for Application-Level Resource Management," 1995, https://pdos.csail.mit.edu/6.828/2008/readings/engler95exokernel.pdf (Year: 1995).*

Mitchell et al., "Using One-Sided RDMA Reads to Build a Fast, CPU-Efficient Key-Value Store," 2013, https://www.usenix.org/system/files/conference/atc13/atc13-mitchell.pdf (Year: 2013).*

Sabatini et al., "Avionics-based GNSS integrity augmentation synergies with SBAS and GBAS for safety-critical aviation applications," 2016 IEEE/AIAA 35th Digital Avionics Systems Conference (DASC), Sacramento, CA, USA, 2016, pp. 1-10, doi: 10.1109/DASC.2016.7778076. (Year: 2016).*

Takasu, Tomojii , et al., "Kalman-Filter-Based Integer Ambiguity Resolution Strategy for Long-Baseline RTK with Ionosphere and Troposphere Estimation", Tokyo University of Marine Science and Technology, Japan, revised Oct. 3, 2010—11 pages.

Takenaka , et al., "Geolocation Correction for Geostationary Satellite Observations by a Phase-Only Correlation Method Using a Visible Channe", MPDI, Aug. 1, 2020, retrieved on Oct. 3, 2023. Retrieved from the internet <URL: http://www.mdpi.com/2072-4292/12/15/2472>.

Tanedo, Flip , "Notes on non-holonomic constraints", For P3318, Spring 2013, https://www.physics.uci.edu/~tanedo/files/teaching/P3318S13/Sec_05_nonholonomic.pdf.

Teunissen, P.J.G. , "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G. , "On the GPS widelane and its decorrelating property", Delft Geodetic Computing Centre, Journal of Geodesy (1997) 71: 577-587.

Teunissen, P.J.G. , "The least-squares ambiguity decorrelation adjustment: its performance on short GPS baselines and short observation spans", Journal of Geodesy, (1997) 71: 589-602, 14 pages.

Thombre, Sarang , et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon , "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon , et al., "Innovation: Integrity for safe navigation", https://www.gpsworld.com/innovation-integrity-for-safe-navigation-provided-by-gnss-service/, GPS World, Feb. 12, 2020.

Van Diggelen, Frank , et al., "Google to improve urban GPS accuracy for apps", Dec. 9, 2020, Android Developers Blog.

Van Graas, Frank , et al., "Precise Velocity Estimation Using a Stand-Alone GPS Receiver", Abstract only, Journal of the Institute of Navigation, vol. 51, No. 4, Winter 2004-2005, pp. 283-292, https://www.ion.org/publications/abstract.cfm?articleID=102384.

Verhagen, S. , "The GNSS integer ambiguities: Estimation and validation", Aerospace Engineering, Jan. 31, 2005.

Wang, Yuechen , et al., "Real-time integrity monitoring for a wide area precise positioning system", Satell Navig (2020) 1:24.

Ward, D. D. , et al., "The Uses and Abuses of Asil Decomposition in ISO 26262", 7th IET International Conference on System Safety, incorporating the Cyber Security Conference 2012.

Waserman, Eyal , et al., "A Mixed Integer Least-Squares Formulation of the GNSS Snapshot Positioning Problem", https://github.com/eyalw711/snapshot-positioning, Jun. 2, 2021.

Watanabe, Yoko , et al., "Fault-tolerant final approach navigation for a fixed-wing UAV by using long-range stereo camera system", 2020 International Conference on Unmanned Aircraft Systems (ICUAS) Athens, Greece, Sep. 1-4, 2020.

Weiss, Berntrop K., et al., "GNSS Ambiguity Resolution by Adaptive Mixture Kalman Filter", TR2018-103, Jul. 13, 2018.

Wendel, J. , et al., "Time-Differenced Carrier Phase Measurements for Tightly Coupled GPS/INS Integration", 0-7803-9454-2/06/$20.00/© 2006 IEE, Jul. 5, 2006, 2006 IEEE/ION Position, Location, and Navigation Symposium, Date of Conference: Apr. 25-27, 2006.

Won, Dachee , et al., "Performance Improvement of Inertial Navigation System by Using Magnetometer with Vehicle Dynamic Constraints", Hindawi, vol. 2015, published 2015, Article ID 435062, https://doi.org/10.1155/2015/435062, https://www.hindawi.com/journals/js/2015/435062/.

Wubbena, Gerhard , et al., "PPP-RTK: Precise Point Positioning Using State-Space Representation in RTK Networks", Presented at the 18th International Technical Meeting, ION GNSS-05, Sep. 13-16, 2005, Long Beach, California.

Wubbena, Gerhard , et al., "RTK Networks based on Geo++ GNSMART—Concepts, Implementation, Results", ION GPS 2001, Sep. 11-14, 2001, Salt Lake City, UT.

Xiao, Guorui , "A computationally efficient approach for isolating satellite phase fractional cycle biases based on Kalman filter", 19th EGU General Assembly, EGU2017, proceedings for the conference held Apr. 23-28, 2017 in Vienna., p. 12495.

Yang, Wenhao , et al., "An Improved Relative GNSS Tracking Method Utilizing Single Frequency Receivers", Sensors 2020, 20, 4073; doi:10.3390/s20154073 www.mdpi.com/journal/sensors, 19 pages.

Yang, Y. , et al., "L1 Backup Navigation for Dual Frequency GPS Receiver", Proceedings of the 16th International Technical Meeting of the Satellite Division of the Institute of Navigation (ION GPS/GNSS 2003), Portland, OR, Sep. 2003, pp. 1258-1263.

Zair, Salim , et al., "Outlier Detection in GNSS Pseudo-Range/Doppler Measurements for Robust Localization", Sensors 2016, 16, 580; doi:10.3390/s16040580, www.mdpi.com/journal/sensors.

Zhu, Ni , et al., "GNSS Position Integrity in Urban Environments: A Review of Literature", IEEE Transactions on Intelligent Transportation Systems, 2018, 17p., 10.1109/TITS.2017.2766768.hal-01709519.

Karaim, Malek , et al., "GPS Cycle Slip Detection and Correction at Measurement Level", British Journal of Applied Science & Technology 4(29): 4239-4251, 2014.

(56) References Cited

OTHER PUBLICATIONS

Khanafseh, Samer , et al., "GNSS Multipath Error Modeling for Automotive Applications", Abstract only, Proceedings of the 31st International Technical Meeting of the Satellite Division of the Institute of Navigation (ION GNSS+ 2018), Miami, Florida, Sep. 2018, pp. 1573-1589, https://www.ion.org/publications/abstract.cfm?articleID=16107.
Kilic, Cagri , et al., "ZUPT Aided GNSS Factor Graph with Inertial Navigation Integration for Wheeled Robots", Proceedings of the 34th International Technical Meeting of the Satellite Division of the Institute of Navigation (ION GNSS+ 2021) Sep. 20-24, 2021.
Kim, Jungbeom , et al., "A Low-Cost High-Precision Vehicle Navigation System for Urban Environment Using Time Differenced Carrier Phase Measurements", Proceedings of the 2020 International Technical Meeting, 597 ION ITM 2020, San Diego, California, Jan. 21-24, 2020, https://doi.org/10.33012/2020.17164.
Kissai, Ali , et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Ko, Jonathan , et al., "GP-UKF: Unscented kalman filters with Gaussian process prediction and observation models", Conference Paper, Dec. 2007, 10.1109/IROS.2007.4399284.
Kuusniemi, Heidi , et al., "GNSS Signal Reliability Testing in Urban and Indoor Environments", Proceedings of NTM 2004 Conference (Session A2), San Diego, CA, Jan. 26-28, 2004, The Institute of Navigation.
Lee, Jae Ho , et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.
Lei, Yu , et al., "Prediction of Navigation Satellite Clock Bias by Gaussian Process Regression", Lecture Notes in Electrical Engineering 342:411-423, Jan. 2015.
Li, T. , et al., "Some remarks on GNSS integer ambiguity validation methods", Survey Review, Dec. 5, 2012, vol. 44, No. 326.
Lim, Cheol-Soon , et al., "Feasibility Study on Integration of SSR Correction into Network RTK to Provide More Robust Service", JPNT 7(4), 295-305 (2018).
Lin, Ming , et al., "Robust Gaussian Process Regression for Real-Time High Precision GPS Signal Enhancement", www.gps.gov/systems/gps/performance/accuracy, Jun. 5, 2019.
Liu, Haiying , et al., "A closed-loop EKF and multi-failure diagnosis approach for cooperative GNSS positioning", Engineering, GPS Solutions, Published 2015.
Liu, Xinwei , et al., "Evaluation of Satellite Clock and Ephemeris Error Bounding Predictability for Integrity Applications", Proceedings of the 35th International Technical Meeting of the Satellite Division of The Institute of Navigation (ION GNSS+ 2022), Denver, Colorado, Sep. 2022, pp. 34-43.
Liu, Xinwei , et al., "Investigation into Satellite Clock and Ephemeris Errors Bounding Uncertainty and Predictability", Proceedings of the 2022 International Technical Meeting of the Institute of Navigation, Long Beach, California, Jan. 2022, pp. 252-272.
Madani, Kurosh , et al., "Studies in Computational Intelligence", Revised and Selected Papers of the International Joint Conference, IJCCI 2011, Paris, France, Oct. 24-26, 2011.
Madrid, Navarro , et al., "New Approach for Integrity Bounds Computation Applied to Advanced Precise Positioning Applications", Proceedings of the 28th International Technical Meeting of the Satellite Division of the Institute of Navigation (ION GNSS+ 2015) Sep. 14-18, 2015, Tampa Convention Center, Tampa, Florida.
Maybeck, Peter S., "Stochastic models, estimation, and control", vol. 1, Academic Press, p. 1-16, 133-134, 169-176, 203-220, 275-276, 289-306, 341-362, 411-423 (Year: 1979).
Meng, Xiaoli , et al., "A Robust Vehicle Localization Approach Based on GNSS/IMU/DMI/LIDAR Sensor Fusion for Autonomous Vehicles", Sensors, 2017, 17, 2140.
Mobarak, Jason , et al., "System and Method for GNSS Correction Transmission", U.S. Appl. No. 18/244,567, filed Sep. 11, 2023.
Nathan, Aaron , "Point One Navigation Launches ASIL Positioning Engine to Enable Safe and Precise Autonomous Vehicles", Point One Navigation, Dec. 19, 2022, https://pointonenav.com/news/point-one-navigation-launches-asil-positioning-engine/.
Odijk, Dennis , et al., "On the estimability of parameters in undifferenced, uncombined GNSS network and PPP-RTK user models by means of S-system theory", Journal of Geodesy, Nov. 2015.
Ogaja, Clement A., "Applied GPS for Engineers and Project Managers", ASCE Press, p. 177-179 (Year: 2011).
Parkins, Alexander James, "Performance of precise marine positioning using future modernised global satellite positioning systems and a novel partial ambiguity resolution technique Department of Civil", Environmental and Geomatic Engineering, Aug. 2009.
Parkins, Alex , et al., "System and Method for GNSS Correction Monitoring", U.S. Appl. No. 18/503,662, filed Nov. 7, 2023.
Peng, Hao , et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris , et al., "Shaping Aviation Integrity Two RAIMs for Safety", GPS World The Business and Technology of Global Navigation and Positioning, Apr. 1, 2008.
Petovello, Mark , "How does a GNSS receiver estimate velocity?", Inside GNSS, Mar./Apr. 2015, www.insidegnss.com.
Phelts, R. Eric, et al., "Innovation: Improving ARAIM, An approach using precise point positioning", GPS World, Jun. 13, 2020, https://www.gpsworld.com/innovation-improving-araim/.
Pongsakornsathien, Nichakorn , et al., "A Performance-Based Airspace Model for Unmanned Aircraft Systems Traffic Management", Aerospace, vol. 7(154), 26 pages (Year: 2020).
Pullen, Sam , "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.
Quinonero-Candel, Joaquin , et al., "A Unifying View of Sparse Approximate Gaussian Progress Regression", Journal of Machine Learning Research 6 (2005) 1939-1959. (Year: 2005).
Rasmussen, C.E. , et al., "Gaussian Processes for Machine Learning", MIT Press, 2006, ISBN 026218253X. c 2006 Massachusetts Institute of Technology, (Year: 2006).
Reimer, Christian , et al., "System and Method for Fusing Sensor and Satellite Measurements for Positioning Determination", U.S. Appl. No. 18/115,963, filed Mar. 1, 2023.
Richardson, Julian , "Flexible Generation of Kalman Filter Code", NASA Technical Reports Server (NTRS), Document ID 20060019115, Jan. 1, 2006.
Rodriguez-Solano, Carlos , et al., "Protection Level of the Trimble RTX Positioning Engine for Autonomous Applications", Proceedings of the 34th International Technical Meeting of the Satellite Division of the Institute of Navigation (ION GNSS+ 2021), Sep. 20-24, 2021.
Rothacher, M. , et al., "ANTEX: The Antenna Exchange Format, Version 1.4", Sep. 15, 2010, IGC International GNSS Service, https://kb.igs.org/hc/en-us/articles/216104678-ANTEX-format-description.
Roysdon, Paul F., et al., "GPS-INS Outlier Detection & Elimination using a Sliding Window Filter", 2017 American Control Conference (ACC), May 24-26, 2017, Seattle, WA, USA.
Satirapod, Chalermehon , "Improving the GPS Data Processing Algorithm for Precise Static Relative Positioning", School of Surveying and Spatial Information Systems The University of New South Wales. Jan. 2002.
Schmid, R. , et al., "Estimation of elevation-dependent satellite antenna phase center variations of GPS satellites", Journal of Geodesy (2003) 77: 440-446, May 19, 2003, DOI 10.1007/s00190-003-0339-0.
Schmid, Ralf , et al., "From Relative Absolute Antenna Phase Center Corrections", Conference: IGS Workshop and Symposium 2004.
Schmid, Ralf , "How to Use IGS Antenna Phase Center Corrections", GPS World Tech Talk, Feb. 3, 2010.

(56) References Cited

OTHER PUBLICATIONS

Schmitz, Martin , "RTCM State Space Representation Messages, Status and Plans", PPP-RTK & Open Standards Symposium, Mar. 12-13, 2012, Frankfurt, Germany.
Shapiro, Larry S., et al., "Rejecting Outliers and Estimating Errors in an Orthogonal-Regression Framework", Phil. Trans. R. Soc. Load. A (1995)350, 407-439. (Year: 1995).
Skog, Isaac , et al., "A Low-Cost GPS Aided Inertial Navigation System for Vehicle Applications", 2005 13th European Signal Processing Conference, Sep. 4-8, 2005.
Sleewaegen, Jean-Marie , et al., "Galileo E5b Rover Receiving E5a Corrections? No Problem!", 32nd International Technical Meeting of the Satellite Division of the Institute of Navigation (ION GNSS+ 2019), Miami, Florida, Sep. 16-20, 2019.
Smolyakov, Ivan , et al., "System and Method for Determining GNSS Corrections", U.S. Appl. No. 18/241,542, filed Sep. 1, 2023.
Snelson, Edward , et al., "Sparse Gaussian Process using Pseudo-inputs", NIPS'05: Proceedings of the 18th International Conference on Neural Information Processing Systems, Dec. 2005, pp. 1257-1264.
Subirana, J. Sanz, et al., "Carrier Phase Cycle-Slip Detection—Navipedia", https://gssc.esa.int/navipedia/index.php/Carrier_Phase_Cycle-Slip_Detection, published 2011.
Takasu, Tomoji , et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.
Kim, Donguk , et al., "Modified Kriging Based Double-Difference Tropospheric Correction Interpolation Method for Network RTK User", Proceedings of the 30th International Technical Meeting of the Satellite Division of the Institute of Navigation (ION GNSS+ 2017), Sep. 25-29, 2017, Oregon Convention Center. Portland, Oregon.
Li, Yihe , et al., "Improved PPP Ambiguity Resolution Considering the Stochastic Characteristics of Atmospheric Corrections from Regional Networks", Sensors 2015, 15, 29893-29909; doi:10.3390/s151229772, www.mdpi.com/journal/sensors, published Nov. 30, 2025.
Li, Xingxing , et al., "Real-time precise point positioning regional augmentation for large GPS reference networks", GPS Solut (2014) 18:61-71, published Jan. 24, 2013.
Sparks, Lawrence , et al., "Estimating ionospheric delay using kriging", Radio Science, vol. 46, RS0D21, doi:10.1029/2011RS004667, 2011, published Oct. 27, 2011.
Yang, Lei , et al., "Numerical weather modeling-based slant tropospheric delay estimation and its enhancement by GNSS data", Geo-spatial Information Science, 2013, vol. 16, No. 3, 186-200, http://dx.doi.org/10.1080/10095020.2013.817107, published Aug. 13, 2013.
"An Introduction to GNSS, Chapter 4, GNSS Error Sources", https://novatel.com/an-introduction-to-gnss/chapter-4-gnsserror-sources, published 2015.
"Geo++ SSR for Network-RTK, PPP and PPP-RTK", https://geopp.de/wp-content/uploads/2020/09/SSR_Flyer_v3.pdf, Sep. 2015.
"IGS State Space Representation (SSR) Format Version 1.00", International GNSS Service (IGS), Oct. 5, 2020.
"Integrity—Navipedia", https://gssc.esa.int/navipedia/index.php/Integrity, published 2011.
"Navstar GPS Space Segment/Navigation User Segment Interfaces", IS-GPS-200L, 228 pages (Year: 2020), May 14, 2020.
"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.
"RAIM", GMV, 2011, RAIM.
"Road vehicles Functional safety Part 1: Vocabulary", ISO 26262-1:2018, https://www.iso.org/standard/68383.html, Abstract, published Dec. 2018.
"Safe Position Augmentation for Real-Time Navigation (SPARTN) Interface Control Document Version 1.8.0", Jan. 2020, Sapcorda Services GmbH.
"Swift Navigation Binary Protocol", Version 3.4.5, Mar. 10, 2021, pp. 1-156.
"The First in China | Bynav Alice GNSS SOC Awarded ISO 26262 ASIL B Functional Safety Product Certification", Gasgoo, https://autonews.gasgoo.com/m/70028360.html, Sep. 22, 2023.
"Wikipedia (Covariance matrix)", https://en.wikipedia.org/wiki/Covariance_matrix, downloaded May 2, 2023 (Year: 2023).
Altmayer, Christian , "Cycle Slip Detection and Correction by Means of Integrated Systems", ION Institute of Navigation, Proceedings of the 200 National Technical Meeting of the Institute of Navigation, Abstract, Jan. 26-28, 2000.
Angelo, Joseph , et al., "System and Method for Detecting Outliers in GNSS Obervations", U.S. Appl. No. 18/116,117, filed Mar. 1, 2023.
Berntorp, Karl , et al., "Bayesian Sensor Fusion of GNSS and Camera With Outlier Adaptation for Vehicle Positioning", Mitsubishi Electric Research Laboratories, https://www.merl.com, Aug. 6, 2022.
Bijl, Hildo , et al., "Online sparse Gaussian process regression using FITC and PITC approximations", IFAG—Papers on Line vol. 48, Issue 28, 2015, pp. 703-708 (Year: 2015).
Blanch, Juan , et al., "Gaussian Bounding Improvements and an Analysis of the Bias-sigma Tradeoff for GNSS Integrity", Proceedings of the 2021 International Technical Meeting of the Institute of Navigation, Jan. 2021, pp. 703-713.
Blanch, Juan , et al., "RAIM with Optimal Integrity and Continuity Allocations Under Multiple Failures", IEEE Transactions on Aerospace and Electronic Systems, vol. 46, No. 3, Jul. 2010.
Boda, Aaron , "Cycle Slip Detection using PVA Kalman Filter", Technical Report • Dec. 2017.
Brack, A. , "Optimal Estimation of a Subset of Integers With Application to GNSS", Artificial Satellites, vol. 51, No. 4—2016 DOI: 10.1515/arsa-2016-0011.
Brocard, Philippe , "Integrity monitoring for mobile users in urban environment", https://tel.archives-ouvertes.fr/tel-01379632/document, submitted Oct. 11, 2016.
Brocard, Philippe , et al., "System and Method for Bounding a Satellite Positioning Solution Integrity", U.S. Appl. No. 18/537,212, filed Dec. 12, 2023.
Brocard, Philippe , et al., "System and Method for Distributed Integrity Monitoring", U.S. Appl. No. 18/491,167, filed Oct. 20, 2023.
Bruno, Jon , et al., "A realistic simulation framework to evaluate ionospheric tomography", Advances in Space Research 65 (2020) 891-901.
Cassel, Ryan , "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.
Chen, Liang , et al., "GNSS High-Precision Augmentation for Autonomous Vehicles: Requirements, Solution, and Technical Challenges", Remote Sens. 2023, 15,1623. https://doi.org/ 10.3390/rs15061623.
Chen, X. , et al., "New Tools for Network RTK Integrity Monitoring", Proceedings of the 16th International Technical Meeting of the Satellite Division of The Institute of Navigation (ION GPS/GNSS 2003) Sep. 9-12, 2003 Oregon Convention Center, Portland, OR, Abstract only.
Chiu, David S. , et al., "Bierman-Thornton UD Filtering for Double-Differenced Carrier Phase Estimation Accounting for Full Mathematical Correlation", Jan. 2008, ION NTM 2008, pp. 756-762., Jun. 23, 2017 00:00:00.0.
Cinque, Daniele , et al., "Experimental Validation of a High Precision GNSS System for Monitoring of Civil Infrastructures", Sustainability 2022, 14, 10984. https://doi.org/10.3390/su141710984.
Cole, D.A. , et al., "Locally induced Gaussian processes for large-scale simulation experiments", Stat Comput 31, 33 (2021). https://doi.org/10.1007/s11222-021-10007-9 (Year: 2021).

(56) References Cited

OTHER PUBLICATIONS

Collin, Jussi , et al., "TKT-2546 Methods for Positioning", Tampere University of Technology, 2010, 50 pages.
Davidson, Pavel , et al., "Improved Vehicle Positioning in Urban Environment through Integration of GPS and Low-Cost Inertial Sensors", European Navigation Conference, ENC-GNSSAt: Naples, Italy, May 2009.
Ding, Wei , et al., "Carrier Phase-Based Precise Heading and Pitch Estimation Using a Low-Cost GNSS Receiver", Remote Sens. 2021, 13,3642. https://doi.org/ 10.3390/rs13183642.
Drescher, Ralf , "Fast convergence of Trimble CenterPoint RTX by regional augmentation", Trimble Terrasat GmbJ, Munich, EGU General Assembly 2015, Vienna, Thursday, Apr. 16, 2015.
Erickson, Collin B., et al., "Comparison of Gaussian Process Modeling Software", European Journal of Operational Research 266 (2018) 179-192 (Year: 2018).
Farrell, James L., "Carrier Phase Processing Without Integers", ION 57th Annual Meeting/CIGTF 20th Biennial Guidance Test Symposium, Jun. 11-13, 2001, Albuquerque, NM.
Favey, Etienne , et al., "Dead reckoning fills-in GPS navigation gap", EE Times, Automotive Designline, Aug. 18, 2011.
Feng, Shaun , et al., "Carrier phase-based integrity monitoring for high-accuracy positioning", GPS Solution, Apr. 2009.
Freda, Peirluigi , et al., "Time-differenced carrier phases technique for precise GNSS velocity estimation", GPS Solut, DOI 10.1007/ s10291-014-0425-1, published online Dec. 31, 2014.
Gargiulo, Gianluca, et al., "GNSS Integrity and protection level computation for vehicular applications", Conference: Proceedings of 16th Ka and broadband communications—navigation and earth observation conference, Jan. 2010, https://www.researchgate.net/ publication/239949398_GNSS_Integrity_and_protection_level_ computation_for_vehicular_applications.
Geng, Jianghui , et al., "Toward global instantaneous decimeter-level positioning using tightly coupled multi-constellation andmulti-frequency GNSS", Journal of Geodesy, vol. 92, p. 977-991 (Year: 2019).
George, Jitin , "C2000 MCU SafeTI control solutions: An introduction to ASIL decomposition and SIL synthesis", Texas Instruments, Apr. 2019.
Gratton, Livio , et al., "Carrier Phase Relative RAIM Algorithms and Protection Level Derivation", Journal of Navigation (2010), 63, 215-231, doi: 10.1017/S0373463309990403.
Gunning, Kazuma, et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.
Henkel, Patrick , et al., "Joint L-/C-Band Code and Carrier Phase Linear Combinations for Galileo", International Journal of Navigation and Observation, vol. 2008, Article ID 651437, 8 pages.
Hirokawa, Dr. Rui , "Recent Activity of International Standardization for High-Accuracy GNSS Correction Service", Mitsubishi Electric, Jun. 27, 2019.
Huang, Panpan , "Airborne GNSS PPP Based Pseudolite System", School of Civil and Environmental Engineering Faculty of Engineering UNSW. Jun. 2019.
Ibrahim, Hassan E., et al., "A Regional Stochastic Model for NOAA-Based Residual Tropospheric Delay", ION NTM 2008, Jan. 28-30, 2008, San Diego, CA.
Inyurt, Samed , et al., "Ionospheric TEC Forecasting Using Gaussian Process Regression (GPR) and multiple Linear Regression (M LR) in X Turkey", Astrophys Space Sci (2020) 365:99, https://doi .org/10.1007 / s10509-020-03817-2 (Year: 2020).
Karaim, Malek , et al., "GNSS Error Sources", https://www. intechopen.com/books/multifunctional-operation-and-application-of-gps/gnss-error-sources, published Apr. 6, 2018.
Wübbena, et al., "Network-Based Techniques for RTK Applications", GPS Society—Nov. 16, 2001 (Nov. 14, 2001, XP055590691, http://www.geopp.de/pdf/gpsjin01_p.pdf.

* cited by examiner

| CRC | Operation | Payload size | Payload |
|---|---|---|---|

SYSTEM AND METHOD FOR GNSS CORRECTION MONITORING

CROSS-REFERENCE TO RELATED APPLICATIONS

This application claims the benefit of U.S. Provisional Application No. 63/423,277 filed 7 Nov. 2022, which is incorporated in its entirety by this reference.

TECHNICAL FIELD

This invention relates generally to the satellite positioning field, and more specifically to a new and useful system and method in the satellite positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
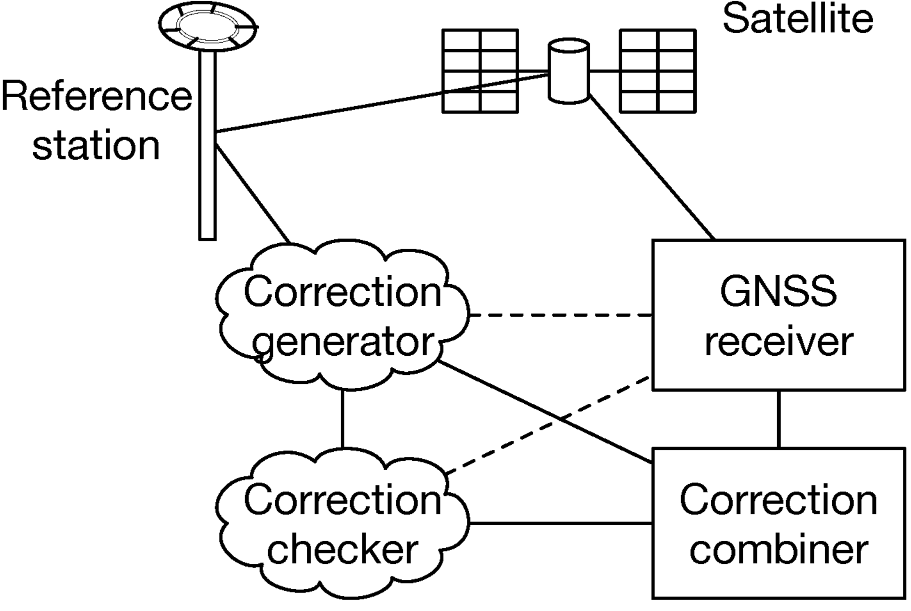
FIG. 2 is a schematic representation of an example of the system.

As shown in FIG. 2, the system can include a GNSS receiver and a computing system. The computing system can include, for example, a correction generator, one or more correction checker, one or more correction combiner, and/or any suitable components (e.g., a positioning engine, integrity modules, etc.). The system can be in communication with one or more data sources (e.g., satellites, reference stations, etc.).

Figure 1:
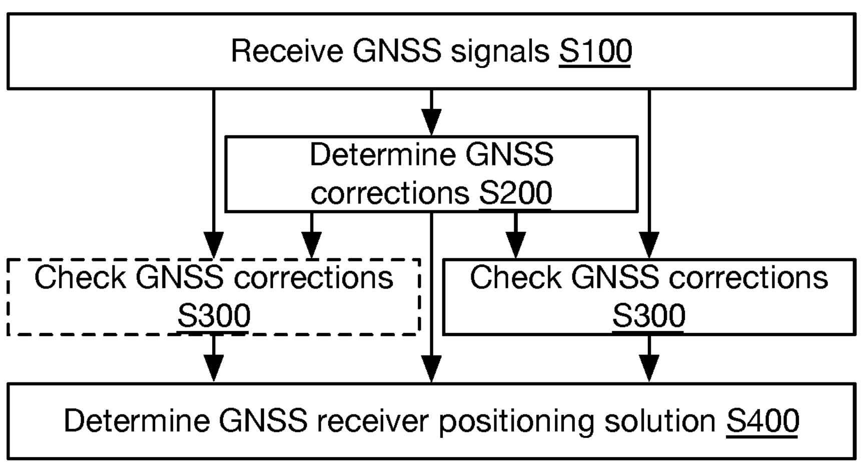
FIG. 1 is a schematic representation of the method.

As shown in FIG. 1, the method can include receiving satellite signals S100, determining GNSS corrections S200, checking the GNSS corrections S300, and optionally determining a GNSS receiver positioning solution S400.

The system and method preferably function to determine (e.g., calculate, estimate, predict, etc.) GNSS corrections and/or a risk (or similarly as safety level, achievable safety, etc.) associated with using the GNSS corrections. However, the system and method can otherwise be used.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits

Variations of the technology can confer several benefits and/or advantages.

First, the inventors have discovered that software operating on a cloud computing server can be difficult to achieve an ASIL safety rating (e.g., the standards specified in ISO 26262 exclude, and therefore are generally incongruent with, poorly compatible with, etc., software running on a cloud computing server). However, the use of a cloud computing server can be beneficial for having less constraints (e.g., power, bandwidth, etc.) than an on-board computing system (e.g., operating on an external system, GNSS receiver, etc.). Thus, the inventors have discovered a means for achieving an equivalent to an ASIL safety rating (e.g., the same or comparable results as would be achieved using electrical and/or electronic systems installed in road vehicles) that, in some variants, integrates computations from a cloud computing server. In general, references to achieving an ASIL certification or standard herein can refer to achieving the equivalent to an ASIL rating, an actual ASIL rating, and/or can refer to any suitable ASIL rating analogue (e.g., a rating based on IEC 61508).

Second, variants of the technology can enable a risk level associated with a GNSS correction to be determined within a cloud computing environment and achieve a target safety level. For example, GNSS corrections can be monitored to achieve a target ASIL (automotive safety integrity level) level such as ASIL A, ASIL B, ASIL C, ASIL D, QM, and/or any suitable target ASIL. For instance, by decomposing the target ASIL into a plurality of lower ASILs (such as by decomposing a target ASIL B level into 2 ASIL A levels), the GNSS corrections can be checked (e.g., monitored) independently for each of the plurality of lower levels where combining the plurality of checks can enable the GNSS corrections to achieve the target ASIL. As an illustrative example, a GNSS correction can be independently monitored by two corrections monitors (each of which is certified to ASIL A standard, where the correction monitors can operate in a cloud computing server) and the resulting corrections and correction monitoring streams can be combined (e.g., at a correction monitor or correction combiner that operates on hardware certified to ASIL B) to achieve an ASIL B safety level. However, the GNSS corrections can achieve any suitable safety level in any suitable manner.

Third, variants of the technology can decrease (e.g., avoid, prevent, hinder, etc.) a probability of interference (e.g., one operation interfering with or changing information accessed by another operation) between software processes or instantiations. For example, by splitting software components (particularly those that are intended to operate as ASIL components such as integrity monitors, reference station monitors, observation monitors, corrections generators, corrections message generator, etc.) into separate parent and child processes (as shown for example in FIG. 8), the risk of interference can be mitigated.

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

3. System

The system and method preferably function to determine (e.g., calculate, estimate, predict, etc.) GNSS corrections and/or a risk (or similarly as safety level, achievable safety, etc.) associated with using the GNSS corrections. However, the system and method can otherwise be used. As shown in FIG. 2, the system can include a GNSS receiver and a computing system. However, the system can additionally or alternatively include any suitable component(s).

The system can be in communication with one or more data sources. Data sources can include: receivers, sensors (e.g., located onboard the receiver, the external system, a reference station, etc.), databases, reference stations, satellites, and/or any other suitable data source. Examples of data that can be used include: satellite signals, sensor data, reference station satellite signals (e.g., satellite signals observed at a reference station), and/or any other suitable data.

The GNSS receiver preferably functions to measure a set of satellite signals (e.g., satellite observations) from one or more satellites. In variants, the GNSS receiver (e.g., a processor or measurement engine thereof) can determine the location (e.g., by using pseudorange, by using carrier phase) of the GNSS receiver (e.g., the receiver antenna, the external system, etc.) based on the satellite signals and/or sensor readings. The GNSS receiver can be in communication with a computing system, can include a computing system (e.g., a processor, a positioning engine, a fusion engine, etc.), can be integrated with the computing system, and/or the GNSS receiver and computing system can be arranged in any suitable manner. The GNSS receiver can be a stand-alone device (e.g., a stand-alone antenna or set of antennas), can be integrated into the rover (e.g., be a component of an automobile, aero vehicle, nautical vehicle, etc.), can be (e.g., be included in, be a component of, be a chip of, etc.) a user device (e.g., smart phone, laptop, cell phone, smart watch, etc.), and/or can be configured in any suitable manner.

The set of satellite signals can include orbital data, timestamp, range rate data, carrier phase data, pseudorange data, doppler data, and/or any suitable data. The set of satellite signals can be associated with metadata (e.g., ephemeris), and/or any suitable data. The set of satellite signals can include satellite signals corresponding to satellites from one or more satellite constellation (e.g., Global Positioning System (GPS), GLObal Navigation Satellite System (GLONASS), BeiDou positioning System (BDS), Galileo, Navigation with Indian Constellation (NavIC), Quasi-Zenith Satellite System (QZSS), GPS Aided Geo Augmented Navigation (GAGAN), etc.). The set of satellite signals can additionally or alternatively include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

In variants of the system including more than one GNSS receiver (e.g., more than one antenna), each GNSS receiver can be the same or different. For example, different GNSS receivers can be configured to receive satellite observations associated one or more satellite constellations, one or more carrier frequencies (e.g., the L1, L2, L5, E1, E5a, E5b, Eab, E6, G1, G3, B1, B2, B3, LEX, etc. frequencies), and/or corresponding to any suitable data.

The computing system preferably functions to process data (e.g., satellite observations, reference station observations, sensor data, etc.) received by the GNSS receiver(s) and/or the sensor(s), but can otherwise function (e.g., to generate operating instructions for an external system or rover based on the positioning solution). The computing system can: aggregate the data (e.g., combine the receiver satellite observations, reference station satellite observations, satellite corrections, and/or sensor data; reorganize the receiver satellite observations, reference station satellite observations, and/or sensor data such as based on the timestamp, time of transmission, time of receipt, etc.; etc.), filter the data (e.g., to calculate state vectors, ambiguities such as phase ambiguities, etc. associated with the data), determine GNSS corrections, check the GNSS corrections, combine the GNSS corrections, determine ambiguities in the satellite observations, calculate the receiver position (e.g., based on the ambiguities), calculate the external system location, correct the data (e.g., correct the satellite observations for clock errors, hardware bias, atmospheric effects, etc. such as based on corrections received from a corrections service), detect faults, and/or can process the data in any suitable manner. The computing system can be local (e.g., to the rover or external system, to the GNSS receiver, to a reference station, etc.), remote (e.g., cloud computing, server, networked, etc.), and/or otherwise distributed.

The computing system can include, for example, a correction generator, one or more correction checker (e.g., integrity monitor, correction monitor, etc.), one or more correction combiner, a positioning engine, a preprocessor (e.g., an observation monitor, a reference station monitor, etc.), and/or any suitable components.

As an illustrative example, the computing system can include a correction generator and a correction checker operating on a first processor (e.g., of a first cloud server) and a second correction checker operating on a second processor (e.g., of a second cloud server), where the first and second processor are uncorrelated (e.g., failures, issues, errors, seeds, etc. are independent between the first and second processor). In variants of this illustrative example, the computing system can include a correction combiner (e.g., integrated in a hardware, processor collocated with a GNSS receiver, client server, reference station processor, etc.). In a variation of this illustrative example, the correction generator and the correction checker can operate on different processors. However, the computing system can be distributed in any manner.

Separate components (particularly those that achieve or are rated to achieve ASIL A safety level, ASIL B safety level, ASIL C safety level, and/or ASIL D safety level) are preferably configured to hinder (e.g., avoid, prevent, mitigate, minimize a risk of, decrease a risk of, etc.) interference (e.g., within the component, between components, etc.), also referred to as configured to have “freedom from interference” or “free of interference.” The freedom from interference can include freedom from interference in timing, freedom from interference in execution, freedom from interference in memory, freedom from interferences due to exchange of information and/or freedom from any suitable interference(s). Freedom from interference can be achieved by splitting operation processes into subprocesses (e.g., a parent and child processes) where the subprocesses access different memory regions (e.g., different subpools, preallocated memory pools, etc.), by operating disparate processes (e.g., engines, monitors, generators, checkers, combiners, etc.) or subprocesses on different processors, and/or can otherwise be achieved.

In specific variants, one or more observation monitor, correction checker, correction combiner, positioning engine (also referred to as fusion engines such as when sensor data is fused with satellite-positioning data, as disclosed in U.S. patent application Ser. No. 18/073,304 titled ‘SYSTEM AND METHOD FOR FUSING DEAD RECKONING AND GNSS DATA STREAMS” filed 1 Dec. 2022 or U.S. patent application Ser. No. 18/115,963 titled ‘SYSTEM AND METHOD FOR FUSING SENSOR AND SATELLITE MEASUREMENTS FOR POSITIONING DETERMINATION’ filed 1 Mar. 2023 each of which is incorporated in its entirety by this reference), and/or other suitable components can be configured to be free from interference. Although they typically are not, components can be designed to be free from interference even if they are not ASIL rated (e.g., to support future aims to achieve an ASIL rating). However, any suitable component (e.g., GNSS corrections generator) can be configured to be free from interference.

When different subprocesses access different memory regions, data and/or information can be passed between the different subprocesses using one-way communications (e.g., gated based on whether the child and/or parent process are performing other operations, using IPC pipes, etc.), by having each subprocess access a shared memory region (e.g., where the data can be configured to indicate whether it has been changed, using a handler such as a freedom from interference (ffi) handler to control access to the shared memory region, etc.), and/or can pass information in any manner.

Figure 7:
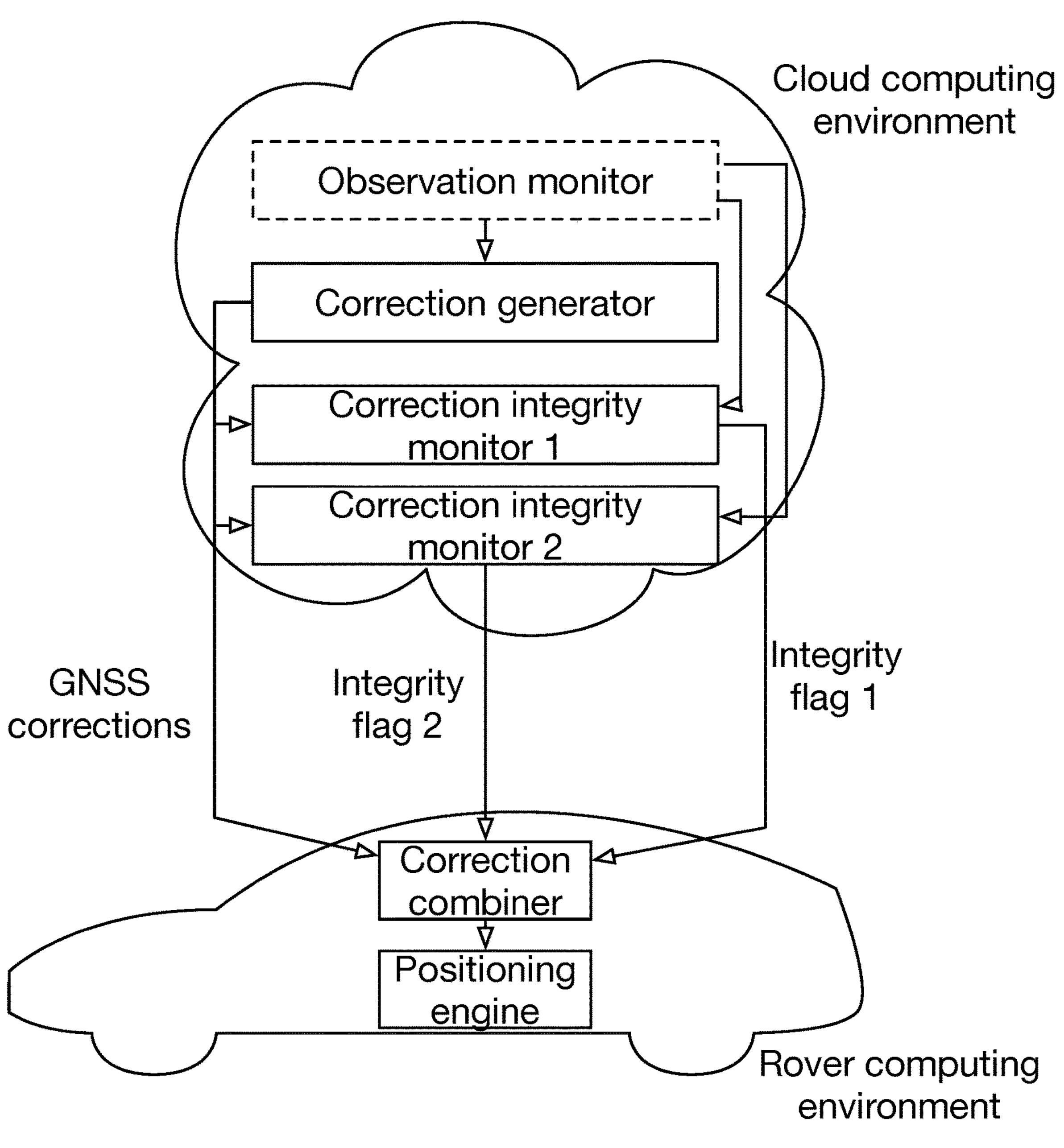
FIG. 7 is a schematic representation of an example of the system.
Figures 8, 9:
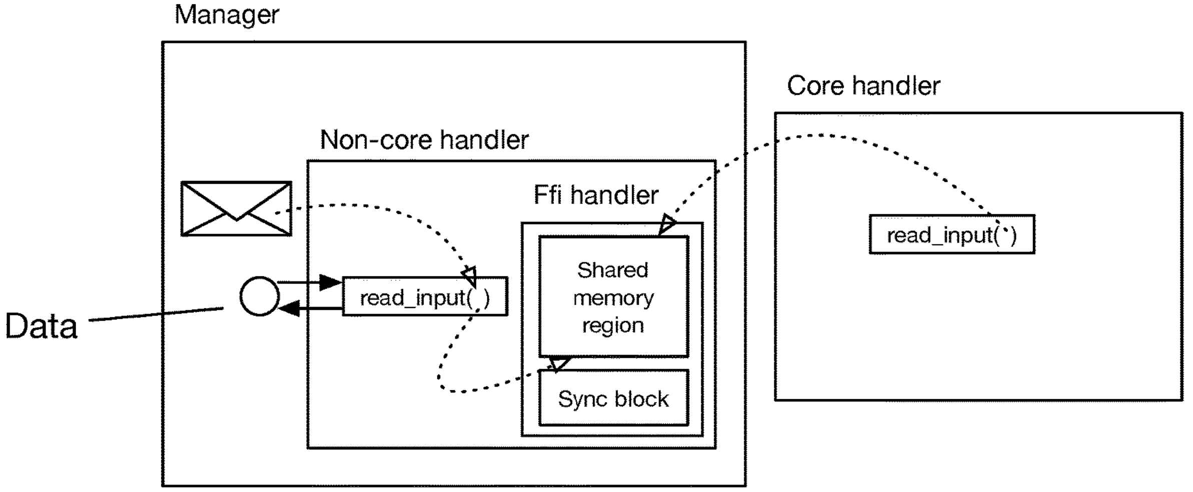
FIG. 8 is a schematic representation of an example of software components that are configured to be free from interference (e.g., interference in timing, interference in execution, interference in memory, interferences due to exchange of information, etc.).
FIG. 9 is a schematic representation of an example of data in a memory block for transferring data between a manager and a handler (particularly separate manager and handlers such as between a manager and a core handler in the example shown in FIG. 8).

As a specific example, as shown for example in FIG. 8, ASIL safety rated components of the computing system (e.g., components that achieve, are rated for, are designed to, achieve except for operating in a cloud environment, etc. an ASIL rating or ASIL safety level) can be separated into a manager that can function to network the components to other endpoints (e.g., network an observation monitor to a corrections checker, network an observation monitor to a corrections generator, network a corrections generator to a corrections checker, network a correction generator to a corrections combiner, network a corrections checker to a correction combiner, network a correction combiner to a positioning engine, network information between connected datastreams such as datastreams shown for example in FIG. 7, etc.) and a handler (e.g., core handler configured to perform a process (function) of the component, where the handler and the manager operate in different memory regions. In this specific example, the manager and handler can communicate through a shared memory region (e.g., a data bridge between the manager and the handler), where the manager fills the data in the shared memory region (e.g., in a shared values vector) while the handler waits for the manager to finish filling the data (e.g., before reading the data). In variations of this specific example, a sync block can be used to control access to the shared memory region (e.g., can act as a control bridge between the manager and the handler). In variations of this specific example, the combination of the shared memory block and the sync block can be referred to as a freedom from interference (ffi) handler (which is integrated with the manager as opposed to a handler or core handler).

As shown for example in FIG. 9, information in the shared memory region (also referred to as a memory block) can include: a payload (e.g., data and/or information to be processed by the handler such as GNSS corrections, correction bounds, satellite observations, etc.; data and/or information generated by the handler such as GNSS corrections, correction bounds, converted satellite observations, converted GNSS corrections, flags, alerts, etc.; arguments to the process or operation; etc.), a payload size (e.g., a number of bytes that the payload should include), an operation (e.g., a process to be performed by the handler such as a GNSS corrections estimation, GNSS corrections checking, satellite observations monitoring, GNSS corrections and flag alignment, reading a specific input, writing an output, writing a metric, etc.), a fingerprint (or other representation such as a hash) of the payload (e.g., a checksum of the payload, a CRC of the payload, etc.) and/or other data or information in the shared memory region, and/or any suitable information. The fingerprint of the payload can function to identify when any part of the shared memory region is altered incorrectly (e.g., unexpectedly; including situations such as buffer overflow, general data corruption, etc.) and improve a confidence that the payload is safe for the handler to use. The fingerprint of the payload is preferably calculated by the manager (or non-core handler or ffi handler thereof) and/or handler after the rest of the data and/or information is added to the shared memory region. The fingerprint of the payload can be calculated, for example, using CRC-1, CRC-3, CRC-4, CRC-5, CRC-6CRC-7, CRC-7-MVB, CRC-8, CRC-10, CRC-11, CRC-12, CRC-13, CRC-14, CRC-15, CRC-16, CRC-17, CRC-21, CRC-24, CRC-30, CRC-32, CRC-40, CRC-64, Fletcher-16, Adler-32, SHA-0, SHA-1, SHA-3, SHA-256, SHA-512, Murmur, and/or using any suitable encoding algorithm(s) (e.g., CRC, checksum, encryption, etc.) over the payload, payload size, operation, and/or other suitable data or information. The share memory region is preferably preallocated to a fixed size (e.g., a maximum size that any operations input and/or output can hold or require, where an operation can be flagged as failed if additional memory is required). However, the shared memory region can be varied, dynamically determined, and/or otherwise be set.

When the handler receives access to the shared memory region, the handler preferably copies (and stores within its memory pool) the data and/or information contained therein (e.g., to ensure that the data and/or information is not modified while the handler processes the data and/or information). Before performing a process, the handler can read (e.g., independently compute and compare the resulting fingerprint to the stored fingerprint) the fingerprint of the payload before processing the request. This mechanism can provide a technical advantage of maintaining an integrity of the payload as when the shared memory region is modified (e.g., by the manager) while the request is being processed (e.g., by the handler), the handler is not impacted and any changes are overwritten. Relatedly, when the manager modifies the shared memory region (or data and/or information therein) while the handler process is saving the results back onto the shared memory region, the fingerprint will not match and data integrity is assured.

The sync block can include a mutex (e.g., a program object that prevents multiple threads from accessing the sync block simultaneously), a condition variable (e.g., whether the sync block and/or shared memory region is locked or unlocked), a state enumerator (e.g., to show the operation state of the manager and/or handler), a sync block flag (e.g., to indicate if there were any errors in the manager and/or handler), and/or any suitable structures and/or data. Typically, both the manager and the handler have read and write permissions to the sync block. As such, the sync block is not technically free from interference, however, when the manager process corrupts the sync block the corruption does not pose a security risk (e.g., only an availability risk) and therefore minimally impacts an integrity and/or safety of the positioning solution (only the availability of GNSS corrections for determining the positioning solution). However, in variants, the manager and/or handler can have read-only, write-only, and/or any suitable permissions.

During operation, the manager typically acquires the lock (i.e., the sole ability to change data in the shared memory region) from the sync block and fills the shared memory region (e.g., providing the payload and other associated information). Upon filling the shared memory region, the manager releases the lock prompting the handler to acquire the lock, read the data from the shared memory region, process the data, and write the results of processing the data back to the shared memory region (after which the handler can release the lock). As such, the sync block helps coordinate the manager and handler interaction (e.g., facilitating handoff of access and/or privileges to the shared memory region). In situations where the manager crashes, the handler also crashes (e.g., prompting a restart of the manager and handler). In situations where the handler crashes (e.g., due to data overflow, insufficient memory, timeout, etc. such as while the handler has the lock), the sync block can relinquish the lock from the handler (e.g., using an inter-process-communication (IPC) mutex, semaphore, etc.) offering the lock to the manager (thereby preventing the manager from freezing and/or crashing as well). However, the sync block and shared memory region can otherwise function (e.g., during operation).

However, other suitable architectures can be used to achieve freedom from interference operation of one or more software components.

The observation monitor (e.g., reference station observation monitor) functions to take as input satellite observations (e.g., observations data) from the GNSS receiver(s) and/or reference station(s) and check them for potential predetermined events and/or outliers (e.g., large errors in pseudorange and/or carrier phase). The observation monitor is preferably configured to detect high dynamic predetermined events (e.g., at least one of environmental feared events, network feared events, satellite clock drift of at most 1 cm/s, issue of data anomaly, erroneous broadcast ephemeris, constellation failure, reference station multipath, and reference station cycle slip), but may be configured to detect datalink predetermined events (e.g., correction message corruption, corruption message loss, correction message spoofing, etc.), low dynamic predetermined events (e.g., at least one of code carrier incoherency, satellite clock step error, satellite clock drift greater than 1 cm/s, pseudorange multipath, carrier phase multipath, carrier phase cycle slip, non-line of sight tracking, false acquisition, Galileo binary offset carrier second peak tracking, spoofing, etc.), and/or any predetermined events. Potential predetermined events may include any detected issues with observations—observations changing too rapidly, or exceeding thresholds, for example.

The observation monitor can additionally or alternatively mitigate the effect of the predetermined events and/or transmit a mitigation (e.g., to be applied by an outlier detector, a carrier phase determination module, etc.) for the predetermined events, which functions to reduce the impact of the predetermined event occurrence on the estimated position (and/or any intermediate data in the estimation of the position). In a first specific example, when a predetermined event is detected among the satellite observations, the satellite observation with the predetermined event can be removed from the set of satellite observations. In a second specific example, when a predetermined event is detected among the satellite observations, the satellite observations can be scaled to decrease and/or remove the effect of the predetermined event. In a third specific example, when a predetermined event is detected among the satellite observations, additional satellite observations can be collected and/or transmitted to mitigate the effect of the predetermined events. In a fourth specific example, when a predetermined event is detected, the associated satellite observation(s) can be corrected (e.g., based on corrections determined from interpolation, secondary sensors, other constellations, etc.). However, any suitable mitigation strategy can be used to mitigate the effects of the predetermined events.

In some variants, the observation monitor can compensate for one or more effects (e.g., receiver to reference time scale clock offset, receiver differential code biases, etc.). However, the compensation can additionally or alternatively be performed by a compensator, a GNSS corrections generator, a corrections checker, and/or using any suitable component.

Variants of the system can include a plurality of observation monitors. For instance, a separate observation monitor can be used to monitor observations provided to each of the GNSS corrections generator, each corrections checker, and/or the positioning engine. However, additionally or alternatively, the same observation monitor can be used for multiple components (e.g., a single observation monitor can operate in a cloud computing environment and a single observation monitor can operate in a local computing environment, a single cloud-based observation monitor can be used, etc.).

The observation monitor (and/or each observation monitor when a plurality of observation monitors are used) preferably operates on a processor (e.g., CPU, GPU, TPU, microprocessor, etc.) that is certified and/or is itself certified to (or rated to achieve) a target ASIL. For instance, in applications that target an ASIL B safety level, the observation monitor(s) are preferably certified to at least ASIL B level, which can enable the GNSS corrections to be verified to ASIL B by the corrections combiner. However, the observation monitor can have any suitable ASIL rating (and/or not be ASIL rated such as for applications of the observation monitor that do not have integrity requirements).

The correction generator preferably functions to determine (e.g., estimate, calculate, generate, filter, identify, etc.) GNSS corrections and/or a bound for a correction error (e.g., a bound for an error of a positioning solution generated using the GNSS corrections), where the GNSS corrections can be used to determine (e.g., facilitate, improve determination of, etc.) the GNSS receiver positioning solution (e.g., to achieve a target accuracy such as 1 mm, 5 mm, 1 cm, 5 cm, 10 cm, 50 cm, 1 m, etc. accuracy; to achieve a target integrity such as a total integrity risk$<10^{-8}$/hr, $10^{-7}$/hr, $10^{-6}$/hr, $10^{-5}$/hr, etc.; etc.). However, the GNSS corrections can otherwise be used. The correction generator is preferably implemented in a remote computing environment (e.g., in a cloud computing server). However, the correction generator can be implemented in any suitable computing environment. The GNSS corrections can include one or more of: satellite orbit corrections, satellite clock corrections, satellite code bias corrections, satellite phase bias corrections, ionosphere corrections (e.g., slant total electron count (STEC) corrections), gridded corrections (e.g., STEC residuals, troposphere delays, etc.), user range accuracy (URA) (e.g., information about the estimated accuracy of the corrections for each satellite or satellite constellation), correction points (e.g., correction point coordinates or grid for which gridded corrections are valid), and/or any suitable corrections (e.g., for any suitable error source(s)).

The GNSS corrections are preferably state space representation (SSR) corrections (e.g., where different error terms are modeled and distributed separately). However, the GNSS corrections can additionally or alternatively be observation state representation (OSR) corrections (e.g., where error terms are lumped together as an observation such as for a virtual reference station, OSR corrections derived from SSR corrections such as disclosed in U.S. patent application Ser. No. 18/079,640 titled 'SYSTEM AND METHOD FOR CORRECTION SATELLITE OBSERVATIONS' filed 12 Dec. 2022 which is incorporated in its entirety by this reference, etc.) and/or any suitable corrections.

In a first specific example, a corrections generator can generate GNSS corrections by processing satellite observations for each reference station of a set of reference stations to determine (e.g., using a PPP filter) a local (e.g., near the reference station) satellite delay (e.g., atmospheric delay, ionosphere delay, troposphere delay, ionosphere gradient, total electron count, slant electron count, etc.), combining the local satellite delays to generate a nonlocal (e.g., global, nonspatially constrained, etc.) model of the satellite delay, and, optionally, generating tiled satellite delays and/or grid (or other distribution of points) satellite delays (e.g., tiled delays and/or grid delays as described in U.S. patent application Ser. No. 17/833,560 titled SYSTEM AND METHOD FOR DETERMINING GNSS POSITIONING CORRECTIONS' filed 6 Jun. 2022 which is incorporated in its entirety by this reference). In a second specific example, a corrections generation can generate GNSS corrections using a Gaussian model to process satellite observations from a set of reference station observations (e.g., in a manner as described in U.S. patent application Ser. No. 17/554,397 title 'SYSTEM AND METHOD FOR GAUSSIAN PROCESS ENHANCED GNSS CORRECTIONS GENERATION' filed 17 Dec. 2021, which is incorporated in its entirety by this reference). The covariance function of the Gaussian model can depend on the GNSS correction to be determined, a target accuracy of the GNSS correction(s), a target speed to generate the GNSS correction(s), and/or can depend on any suitable aspect. Examples of covariance functions include: constant functions, polynomial (e.g., linear, quadratic, piecewise smooth polynomials, etc.) functions, white noise functions, Kronecker delta (or Dirac delta function) functions, squared exponential functions, Ornstein-Uhlenbeck (e.g., Brownian) functions, (e.g., with variable drift terms that are dependent on the current value of the process), Weiner functions, Matérn functions, Bessel functions, periodic functions, rational (e.g., rational quadratic) functions, γ-exponential functions, neural network covariance functions, and/or any suitable covariance function. However, any covariance function can be used. In variations of the second specific example, other state estimators (e.g., Kalman filters, unscented Kalman filters, extended Kalman filters, etc.) can be used (e.g., in addition to as an alternative to the Gaussian Process). However, the GNSS corrections can be determined in any manner.

In some variations of the preceding examples, the corrections generator can receive satellite information (e.g., satellite clock delay, satellite orbit drift, satellite hardware bias, satellite carrier bias, antenna phase center, etc.) that can be combined with and/or used to facilitate calculation of the GNSS corrections of the preceding examples. However, the GNSS corrections can be determined in any manner.

Figure 5:
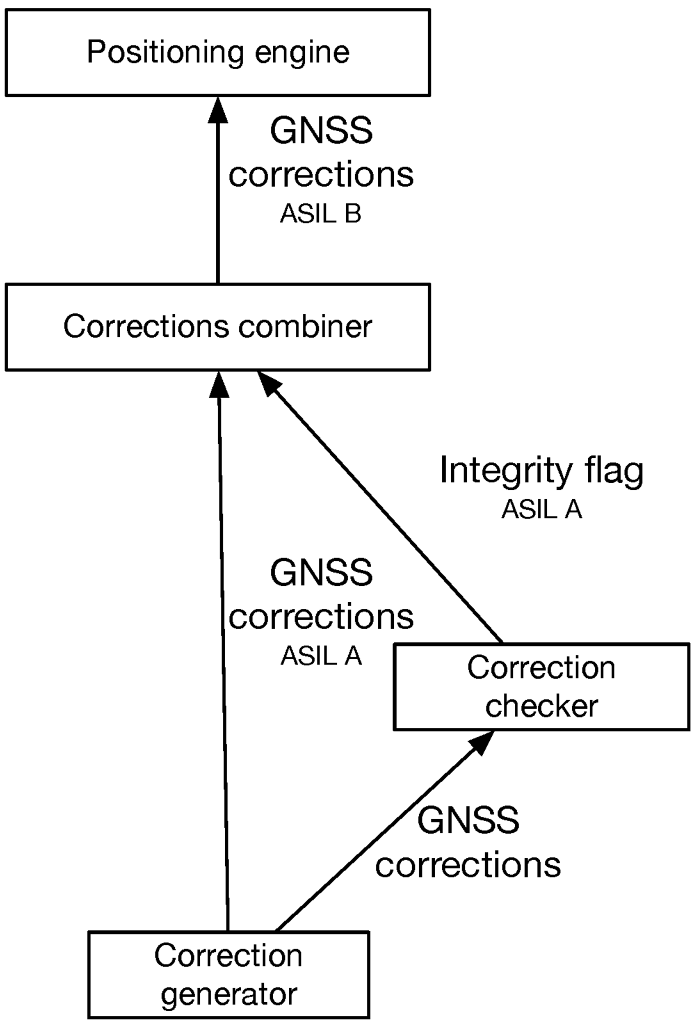
FIG. 5 is a flow chart representation of an example of the method.

The correction generator (and/or the GNSS corrections determined thereby) typically reaches quality management (QM) level (e.g., a risk associated with a hazardous event from the correction generator is not unreasonable and does not require safety measures). In some variants (as shown for example in FIG. 5), the correction generator (and/or the GNSS corrections determined thereby) can achieve (or be rated to achieve) a higher ASIL safety level (e.g., be rated ASIL A, ASIL B, ASIL C, ASIL D, etc.). In these variants, the correction generator preferably operates on a separate processor from a correction checker (e.g., correction monitor), which can provide a technical advantage of reducing a risk of a common hardware failure, common seed, and/or other actions or random event can contaminate both the correction generator and correction checker simultaneously. However, the corrections generator (and/or the GNSS corrections determined thereby) can achieve (or not) any suitable safety level.

The corrections checker (e.g., corrections monitor) preferably functions to ensure that the correction errors don't exceed the bounds with a probability that exceeds the integrity risk (e.g., by monitoring the GNSS corrections for predetermined events), determine an accuracy and/or integrity of a positioning solution determined using the GNSS corrections, and/or can otherwise function. The corrections checker is preferably implemented in a remote computing environment (e.g., on a cloud computing server). However, the corrections checker can additionally or alternatively be implemented in a local computing environment (e.g., GNSS receiver computing system, external system computing system, etc.) and/or in any suitable computing environment. For instance, the corrections checker can be configured to ensure P(Error>Bound|NOT DNU)<=Residual Risk+IRallocation, where P(Error>Bound|NOT DNU) is a probability that an error exceeds a bound and a flag is not issued indicating that the error has exceeded the bound, the residual risk is a (potentially constant) such as a minimum risk (e.g., errors resulting from fault), and IRallocation which can be between a minimum and maximum value (e.g., random statistical errors such as in fault free conditions). The residual risk (per satellite, per satellite constellation, per atmospheric effect, etc.) can be represented, for example, as a probability of onset (e.g., probability that an event or fault starts), a probability that at a given instant in time a predetermined event (e.g., fault) is present (which can be related to the probability of onset based on a duration of the predetermined event), and/or can otherwise be represented.

Inputs to the correction checker can include: satellite observations (e.g., compensated satellite observations such as compensated for one or more effects such as as receiver to reference time scale clock offset, receiver differential code biases, etc.; the same set of satellite observations as used to generate the GNSS corrections; a distinct set of satellite observations from those used to generate the GNSS corrections; etc.), GNSS corrections (e.g., current GNSS corrections, prior GNSS corrections, validated GNSS corrections, GNSS corrections within a threshold time of becoming invalid, GNSS corrections within a validity time window, etc.), global information (e.g., satellite ephemeris), almanac data (e.g., weather information, solar activity, satellite positions, etc.), and/or any suitable inputs can be used.

Outputs from the correction checker can include: flags (e.g., e.g., an alert; an indication of whether the GNSS corrections are safe to use; an indication of whether the GNSS corrections are valid; an indication of an integrity, a total integrity risk, protection level, etc. that can be achieved for a positioning solution leveraging the GNSS correction; etc.), residual information (e.g., residuals remaining after correction satellite observations), GNSS corrections (e.g., GNSS corrections that are safe to use), bounds (e.g., error bounds on the GNSS corrections), and/or any suitable outputs can be generated. Flags can be associated with specific errors, error groups, satellite, satellite constellations, and/or any suitable information. For example, a first flag (e.g., for each satellite) can be used to indicate use or do not use for a satellite orbit, clock, bias (e.g., code bias, phase bias), a second flag can be used to indicate use or do not use for ionosphere, and a third flag can be used to indicate use or do use for troposphere (e.g., vertical hydrostatic delay, vertical wet delay). However, any suitable flags can be generated.

In some variants, the corrections bounds can be decomposed into separate error components. For instance, the error can include (e.g., be decomposed into) a parameter error (e.g., a polynomial of error for orbit, a 2D or 3D model for ionosphere, mapping factor for troposphere, etc.), a model error (e.g., due to a model inaccuracy in representing reality), and/or degradation error (e.g., due to aging of correction). In this example, each term can include a combination of nominal errors (e.g., resulting from propagation of errors during estimation) and unmonitored faults (e.g., errors resulting from a fault or other predetermined event that is not detected, is not detectable, etc.). A bounding model can be determined (e.g., for a given error), for example according to Bound=offset+K*scale where K can be a factor associated with an IRallocation (e.g., selected by a client within bounds such as IRminimum≤IRallocation≤IRmaximum), offset can be a mean value of the error, and scale can be a standard deviation of the error (e.g., modelling the error as a gaussian).

The corrections are preferably monitored using a set of independent satellite observations (e.g., the monitoring satellite observations are preferably independent of the corrections satellite observations). For example, the corrections checker can receive a different set of satellite observations than the corrections generator, the corrections checker can receive satellite observations from a different epoch than the corrections generator, the corrections checker can receive satellite observations associated with different satellites and/or reference stations than the satellite observations received by the satellite generator, and/or the satellite observations used by the corrections checker can otherwise be independent of the satellite observations used by the corrections generator. However, additionally or alternatively the corrections checker can use interdependent satellite observations (e.g., the monitoring satellite observations and the corrections satellite observations can include common satellite observations), the set of corrections satellite observations can include one or more satellite observation that is used to monitor the corrections (e.g., and not used to determined the corrections), and/or the corrections checker can use any suitable satellite observations and/or other data.

In some variants, the corrections checker can determine residual values from applying the corrections to the monitoring satellite observations and comparing the residuals (and/or other corrected reliability reference station observations) to one or more thresholds. The thresholds can be associated with an integrity bound (e.g., when the residuals meet the threshold the corrections can enable an estimated positioning solution or intermediate data determined along the process thereof to achieve at least the integrity bound), a confidence that an integrity bound can be achieved (e.g., a confidence that the corrections can enable an estimated positioning solution or intermediate data determined along the process thereof to achieve at least the integrity bound), and/or any suitable results. In variations of these variants, combinations (and/or residuals determined therefrom) can be compared to a threshold (e.g., bound). The integrity bound can be a fixed value and/or can vary (e.g., depending on the number of satellites represented in the set of satellite observations, depending on the satellite frequencies of satellites represented in the set of satellite observations, depending on the number of satellite constellations represented in the set of satellite observations, depending on the number of satellites for each satellite constellation represented in the set of satellite observations, depending on a probability of missing detection of a feared event, depending on a probability of issuing a false alarm, depending on a target integrity risk, depending on an application, depending on whether an integrity is needed, etc.). In some variations, the corrections checker can track changes in the residuals over time (e.g., residual drift), which can be particularly (but not exclusively) beneficial for monitoring an integrity of a velocity (or other higher derivative of position with respect to time or absement) of the positioning solution. However, the corrections checker can otherwise function. The flag(s) can be associated with a validity set of corrections, individual corrections data (e.g., individual states of state space representation corrections), subsets of validity set of corrections, and/or any suitable corrections.

In a first variant, when the residual (e.g., individual residual, combination residual, etc.) is less than or equal to the threshold, the corrections checker can issue a flag indicating that the GNSS corrections are safe to use (e.g., an OK flag). When the residual is greater than the threshold, the corrections checker can issue (e.g., generate) a flag indicating that the GNSS corrections are not safe to use (e.g., an NOK flag), a flag indicating using the corrections will likely produce an estimate of the position with an integrity or accuracy exceeding a target integrity or accuracy, and/or generate any suitable alert. The flag can be transmitted to the positioning engine which can determine whether or not to use the GNSS corrections (e.g., based on the flag).

In a second variant, when the residual (e.g., individual residual, combination residual, etc.) is less than or equal to the threshold, the corrections can be transmitted to and/or used by the corrections combiner (e.g., to be combined with the GNSS corrections, to be combined with other corrections checks, etc.) and/or positioning engine (e.g., reliability of the corrections can indicate that the corrections are safe to use, will generate an estimated position and/or velocity with a target integrity, an 'ok' alert can be generated, etc.). When the residual is greater than the threshold, the corrections can not be transmitted to the corrections combiner and/or positioning engine.

In a third variant, the preceding first and second variant can be combined (e.g., flags can be generated and corrections can be transmitted or not transmitted depending on the results from the corrections checker). However, the corrections checker can otherwise function.

Figure 3:
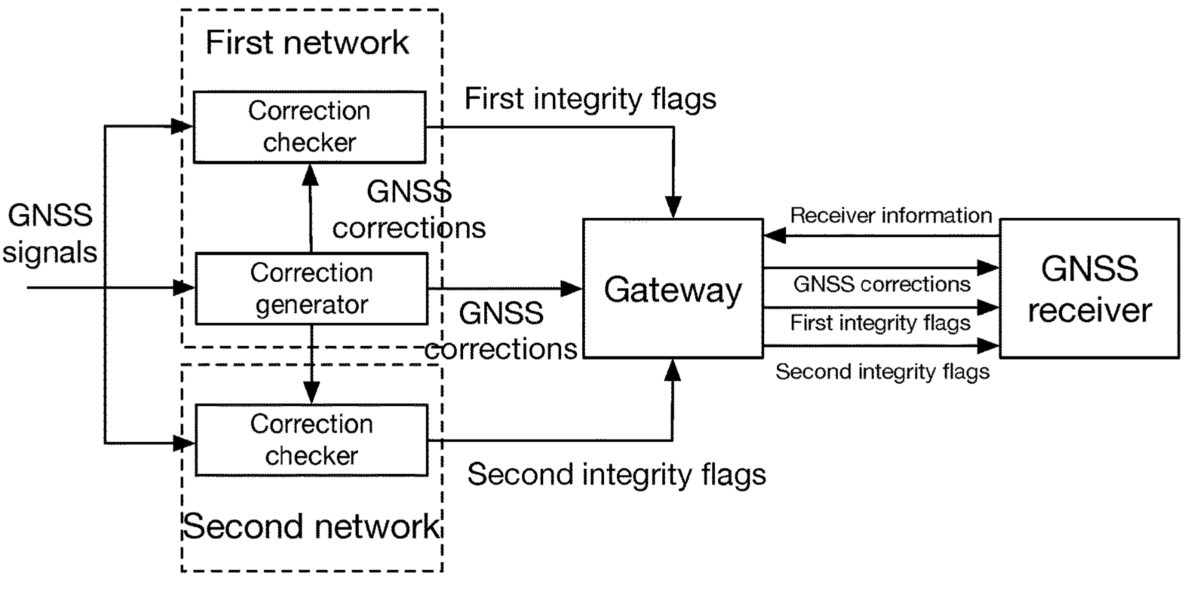
FIG. 3 is a schematic representation of an example of data flow within an exemplary system.
Figure 6:
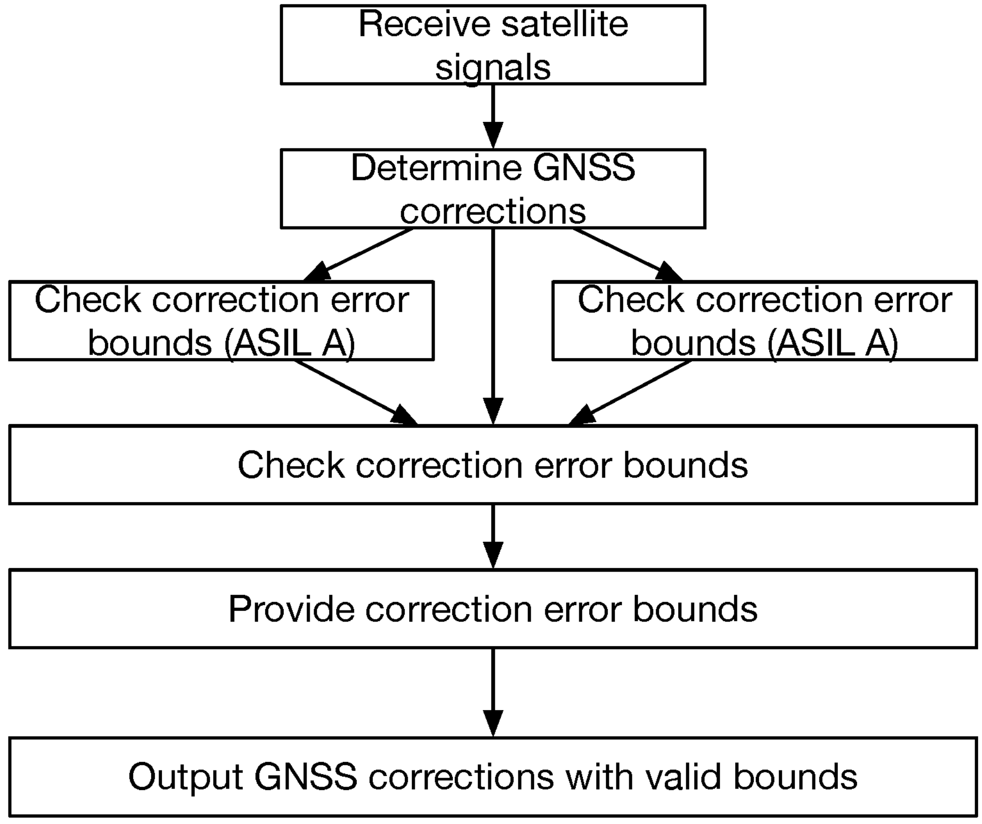
FIG. 6 is a flow chart representation of an example of the method.

The system preferably includes a plurality of corrections checkers (as shown for example in FIG. 6). Each correction checker of the plurality of correction checkers is preferably independent of the remaining correction checkers of the plurality. Independence of the correction checkers can include one or more of: each correction checker being independently coded or compiled (e.g., without duplicating one correction checker to form another); each correction checker operating on a different processor, node, cloud computing server, network, operating systems, hardware, and/or other computing system (e.g., as shown for example in FIG. 3); each correction checker operating using a different set of satellite observations as inputs (e.g., from different satellites, different satellite constellations, different reference stations, different epochs, different frequencies, etc.), and/or the correction checkers can otherwise be independent (e.g., free of common error sources, common error causes, etc.). However, one or more correction checkers may depend on another correction checker (e.g., to generate redundancy in the corrections checking).

Each correction checker of the plurality of corrections checkers can use the same or different inputs. For instance, in some variants, each correction checker can check the GNSS corrections using the same satellite observations (e.g., same epoch, received at the same reference stations, for the same satellites, for the same satellite constellations, etc.). In other variants, each correction checker can check the GNSS corrections using different satellite observations (e.g., different epochs, received at one or more different reference stations, for different satellites, for different satellite constellations, etc.).

However, in some variants (e.g., when the corrections generator is certified to at least ASIL A level), a single corrections checker can be used.

Figure 4:
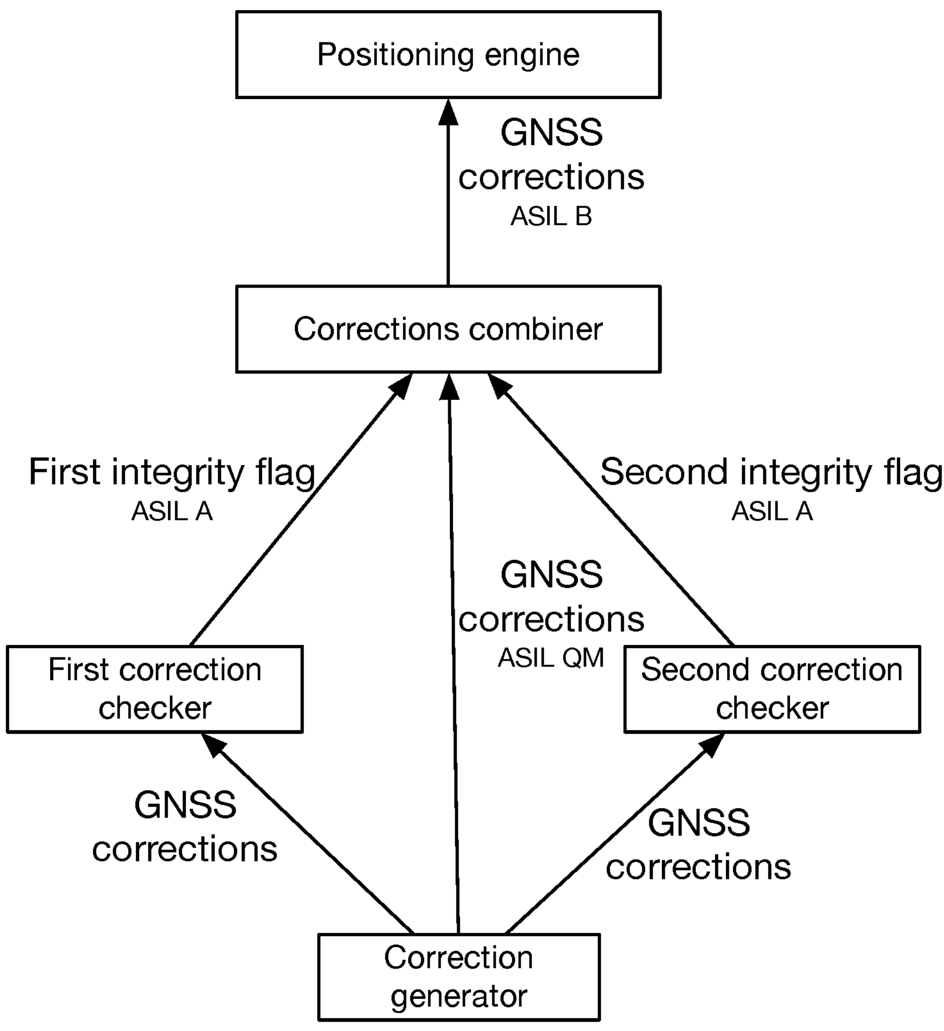
FIG. 4 is a flow chart representation of an example of the method.

The corrections checker (and/or each corrections checker when a plurality of corrections checkers are used) preferably operates on a processor (e.g., CPU, GPU, TPU, microprocessor, etc.) that is certified and/or is itself certified to (or rated to achieve) a target ASIL for the GNSS corrections. For instance, in applications that target an ASIL B safety level, the corrections checker is preferably certified to at least ASIL B level, which can enable the GNSS corrections to be verified to ASIL B by the corrections combiner (as shown for example in FIG. 4). In applications that target an ASIL D safety level, the corrections checker is preferably rated to achieve ASIL D safety level (even if outputs from the corrections checker are at a lower safety level such as ASIL A, ASIL B, or ASIL C). However, the corrections checker can have any suitable ASIL rating (and/or not be ASIL rated such as for applications of the corrections checker that do not have integrity requirements).

The corrections engine (e.g., corrections generator, corrections checker, etc.) can transmit an error mean, error standard deviation, a minimum and maximum IR range (e.g., IRminimum, IRmaximum), a degradation parameter (e.g., associated with each error, associated with each error source, etc.), a rate of change of parameter (e.g., a bound on a rate of change in an error), correlation times (e.g., how long before you consider a parameter as a new independent measurement), GNSS corrections, flags (e.g., each flag generated by each corrections checker), a timestamp associated with the flag (e.g., age of integrity, time of receipt of satellite observations from reference station for each corrections checker, a timestamp as disclosed in U.S. patent application Ser. No. 18/491,167 titled 'SYSTEM AND METHOD FOR DISTRIBUTED INTEGRITY MONITORING' filed 20 Oct. 2023 which is incorporated in its entirety by this reference, etc.), and/or can transmit any suitable information to a positioning engine and/or other endpoint.

The corrections combiner preferably functions to combine GNSS corrections and/or GNSS checker outputs (e.g., corrections flags, corrections bounds, etc.), to determine a correction bound (e.g., an achievable protection level, integrity, etc. when the GNSS corrections are used by the positioning engine), improve a confidence in the GNSS corrections (e.g., certify that the GNSS corrections achieve a target ASIL rating), and/or can otherwise function. The corrections combiner preferably operates on a local computing system (e.g., local to a GNSS receiver, local to an external system, etc.). However, the corrections combiner can operate on a remote computing system (e.g., cloud computing system, monitoring station computing system, etc.) and/or on any suitable computing system.

The corrections combiner preferably operates on a processor (e.g., CPU, GPU, TPU, microprocessor, etc.) that is certified and/or is itself certified to (or rated to achieve) a target ASIL for the GNSS corrections. For instance, in applications that target an ASIL B safety level, the corrections combiner is preferably certified to at least ASIL B level, which can enable the GNSS corrections to be verified to ASIL B by the corrections combiner (as shown for example in FIG. 4). However, the corrections combiner can have any suitable ASIL rating (and/or not be ASIL rated such as for applications of the corrections combiner that do not have integrity requirements).

In some variants, data (e.g., GNSS corrections, corrections flags, corrections bounds, corrections time, etc.) transmitted to the corrections combiner can be configured to enable to enable a check to ensure that all data was received with proper fidelity (e.g., without corruption). For instance, a duplicate of the data and/or information (e.g., in the same format, hashed or encoded such as described in U.S. patent application Ser. No. 18/244,567 titled 'SYSTEM AND METHOD FOR GNSS CORRECTION TRANSMISSION' filed 11 Sep. 2023 which is incorporated in its entirety by this reference, etc.) can be transmitted to enable the corrections combiner (and/or associated modules) to determine whether the proper data was received (e.g., data was transmitted without corruption, no data packages were lost, etc.).

The corrections combiner can match one or more corrections flags with one or more GNSS corrections (e.g., matching atmospheric flags to atmospheric corrections), convert the GNSS corrections and/or corrections bounds based on a line-of-sight vector between a particular satellite and the GNSS receiver, and/or can perform any suitable function(s).

In a specific example, the corrections combiner can compare flags and/or corrections bounds generated by two or more separate corrections checkers. When the flags and/or corrections bounds are within a threshold of each other (e.g., are the same), the corrections combiner can certify that the corrections achieve a target safety level (e.g., ASIL B). When the flags and/or corrections bounds differ by greater than a threshold amount (e.g., flags are different), the corrections may not be certified and/or validated (e.g., a flag indicating that the corrections are not safe to use can be generated), can include a new flag indicating a correction bound that the GNSS corrections can be certified to, and/or the corrections can otherwise be combined or flagged.

The GNSS corrections can be validated for a validation time. The validation time can depend on the external system environment (e.g., atmospheric activity), multipath environment, satellites in line-of-sight of the GNSS receiver, etc.), target protection level, target integrity, target accuracy (e.g., number of corrections, types of corrections, etc.), external system operation (e.g., speed, velocity, attitude, etc.) data connection (e.g., ability of the GNSS receiver or associated hardware to receive corrections), and/or based on any suitable constraint(s) or variable(s). The validation time can be, for example, 10 seconds, 20 seconds, 30 seconds, 60 seconds, 2 minutes, 5 minutes, 10 minutes, 20 minutes, 30 minutes, 60 minutes, 2 hours, values therebetween, and/or can be any suitable amount of time.

The positioning engine preferably functions to determine (e.g., estimate, calculate, etc.) a positioning solution (e.g., position, velocity, attitude, time, etc.) of the GNSS receiver (and/or external system). The positioning engine is preferably implemented on a local processor (e.g., local to the GNSS receiver, local to the external system, local to the corrections checker, etc.). However, the positioning engine can be implemented on a remote processor (e.g., in a cloud computing environment, on a server, etc.) and/or distributed in any manner.

The positioning solution is preferably determined using corrected satellite observations (e.g., a set of satellite observations that are corrected using the GNSS corrections), but can be determined using any suitable satellite observations (e.g., uncorrected satellite observations, differenced satellite observations, etc.). The satellite observations can be precorrected (e.g., before a filter processes the satellite observations to determine the GNSS receiver positioning solution), corrected in an estimator (such as a Kalman filter, extended Kalman filter, unscented Kalman filter, particle estimator, Gaussian process, etc.; where the GNSS corrections can be an input to the estimator), and/or can otherwise be corrected. The positioning engine preferably only uses validated GNSS corrections (e.g., GNSS corrections that have been checked by a corrections checker and indicated has having safe to use flags). However, the positioning engine can use nonvalidated (e.g., GNSS corrections that have not been validated such as during the validation process), unvalidated corrections (e.g., corrections that have lost their validation such as because a validation time has elapsed, a predetermined event is detected, different results are obtained between corrections checkers, etc.), and/or can use any suitable GNSS corrections. For instance, the positioning engine can be operable between two (or more modes) such as a validated mode (e.g., a mode that only accepts, uses, etc. validated GNSS corrections) and a second mode (e.g., a mode that accepts, uses, etc. any suitable GNSS corrections, does not use GNSS corrections, etc.).

The positioning solution is preferably determined using carrier phase (e.g., ambiguity resolved carrier phase), but can additionally or alternatively be determined using pseudorange, doppler, best integer equivarients of the carrier phase, and/or any suitable satellite signal(s). Determining the positioning solution can include determining the carrier phase ambiguity (e.g., to a floating point precision, to integer precision, etc. such as disclosed in U.S. patent application Ser. No. 16/817,196 filed 12 Mar. 2020 entitled "SYSTEMS AND METHODS FOR REAL TIME KINEMATIC SATELLITE POSITIONING" or in U.S. patent application Ser. No. 17/022,924 filed 16 Sep. 2020 entitled "SYSTEMS AND METHODS FOR HIGH-INTEGRITY SATELLITE POSITIONING," each of which is incorporated in its entirety by this reference), determining a set of floating phase ambiguity hypotheses, determining a set of integer phase ambiguity hypotheses from the set of floating phase ambiguity hypotheses, performing hypothesis testing to validate the set of integer phase ambiguities hypotheses, and/or any suitable steps.

The system can optionally include one or more non-satellite-based positioning sensors. For example, the system can include cameras (e.g., monocameras for monocular positioning solution determination methods, stereocameras for stereo camera positioning solution determination methods, for computer vision based positioning solution determination methods, etc.), LiDAR, radar, magnetometer (e.g., for magnetic anomaly aided navigation), inertial navigation sensors (e.g., inertial measurement sensors, wheel tick sensors, etc. for dead reckoning navigation), radio based navigation, stellar navigation sensors (e.g., for tracking and determining positioning solutions based on stellar positions), and/or other suitable non-satellite-based positioning sensors can be used. Software programs (e.g., equivalents to positioning engines) for processing datastreams from the non-satellite-based positioning sensors are preferably rated for a certification of ASIL D safety. The software programs for processing datastreams from the non-satellite-based positioning sensors preferably determine the positioning solution to at least of ASIL A safety level (e.g., ASIL B safety level, ASIL C safety level, ASIL D safety level). By achieving at least an ASIL A safety level, the positioning solutions derived from the non-satellite-based positioning sensor data can be combined with the satellite-based positioning solutions to achieve a higher safety level. For instance, an ASIL B positioning solution (e.g., determined from satellite-based sensors, GNSS receivers, satellite observations, etc.) can be combined with a second ASIL B positioning solution (e.g., derived from non-satellite-based sensors) to achieve an ASIL D rated combined positioning solution. In another example, an ASIL A positioning solution (e.g., determined from satellite-based sensors, GNSS receivers, satellite observations, etc.) can be combined with a second ASIL B positioning solution (e.g., derived from non-satellite-based sensors) to achieve an ASIL C rated combined positioning solution. However, other positioning solution ratings can be achieved. Relatedly, software components used for processing datastreams from the non-satellite-based positioning sensors preferably operate on separate processors from software components for determining the satellite-based positioning solutions (and are configured to be free from interference with each other). However, the software components used for processing datastreams from the non-satellite-based positioning sensors can operate on the same processors as for determining the satellite-based positioning solutions (e.g., when the non-satellite based sensors are used to provide redundancy with the satellite-based sensors, when the non-satellite-based positioning solution is not combined with the satellite-based positioning solution, when the non-satellite based positioning solution is fused with the satellite-based positioning solution such as disclosed in U.S. patent application Ser. No. 18/073,304 titled 'SYSTEM AND METHOD FOR FUSING DEAD RECKONING AND GNSS DATA STREAMS" filed 1 Dec. 2022 or U.S. patent application Ser. No. 18/115,963 titled 'SYSTEM AND METHOD FOR FUSING SENSOR AND SATELLITE MEASUREMENTS FOR POSITIONING DETERMINATION' filed 1 Mar. 2023 each of which is incorporated in its entirety by this reference).

The computing system and/or processors thereof can include one or more: CPUs, GPUs, custom FPGA/ASICS, microprocessors, servers, cloud computing, and/or any other suitable components.

Different subsystems and/or modules discussed above can be operated and controlled by the same or different entities. In the latter variants, different subsystems can communicate via: APIs (e.g., using API requests and responses, API keys, etc.), requests, and/or other communication channels.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system comprising:

a corrections generator configured to:

receive a first set of satellite observations from a first set of reference stations; and determine GNSS corrections and bounds associated with the GNSS corrections using the first set of satellite observations;

a plurality of corrections monitors, each corrections monitor of the plurality of corrections monitors in support of at least ASIL A safety and configured to:

receive a unique set of satellite observations from a set of reference stations;

receive the GNSS corrections from the corrections generator; and generate an integrity flag indicative of whether the GNSS corrections achieve a threshold safety;

a corrections combiner operating in at least an ASIL B certified environment, wherein the corrections combiner is configured tomatch the plurality of integrity flags to the GNSS corrections; and a positioning engine configured to determine a positioning solution of a GNSS receiver using the converted GNSS corrections;

wherein each integrity flag meets or exceeds an ASIL A safety rating, wherein the GNSS corrections meet or exceed an ASIL B safety rating after being matched to the plurality of integrity flags by the corrections combiner, wherein the positioning solution achieves ASIL D safety by combining the positioning solution determined using the positioning engine with an independent positioning solution derived from a positioning sensor that is distinct from the GNSS receiver, wherein the independent positioning solution is certified to at least ASIL B safety.

2. The system of claim 1 further comprising a reference station observation monitor configured to monitor at least one of the first set of satellite observations or the unique sets of satellite observations.

3. The system of claim 2, wherein each corrections monitor of the plurality of corrections monitors and the reference station observation monitor is configured to operate free from interference.

4. The system of claim 3, wherein each corrections monitor of the plurality of corrections monitors and the reference station observation monitor comprises:

a manager configured to network the each corrections monitor of the plurality of corrections monitors or the reference station observation monitor to an endpoint;

a handler configured to perform a process of the each corrections monitor of the plurality of corrections monitors and the reference station observation monitor, wherein the handler performs the process in a separate memory region of a processor from the manager.

5. The system of claim 4, wherein the manager and handler both access a shared memory region, wherein data to be shared between the manager and the handler in the shared memory region comprises a payload, a payload size, an operation to be performed on the payload, and a fingerprint of the payload; wherein the handler reads the fingerprint of the payload before performing the operation on the payload.

6. The system of claim 5, further comprising a sync block that controls access to the shared memory region for the manager and the handler.

7. The system of claim 1, wherein the corrections generator is in support of quality managed (QM) safety.

8. The system of claim 1, wherein the plurality of corrections monitors comprise two corrections monitors each operating on a processor separate from a processor the corrections generator operates on.

9. A system comprising:

a corrections generator configured to:

receive a first set of satellite observations from a first set of reference stations; and determine GNSS corrections and bounds associated with the GNSS corrections using the first set of satellite observations;

a corrections monitor in support of at least ASIL A safety and configured to:

receive a second set of satellite observations from a set of reference stations;

receive the GNSS corrections from the corrections generator;

generate an integrity flag indicative of whether the GNSS corrections achieve a threshold safety based on a residual calculated between the second set of satellite observations and the GNSS corrections;

a positioning engine configured to determine a positioning solution of a GNSS receiver using the GNSS corrections;

wherein the corrections monitor comprises a manager and a handler, wherein the handler operates free from interference from the manager, wherein the positioning solution achieves ASIL D safety by combining the positioning solution determined using the positioning engine with an independent positioning solution derived from a positioning sensor that is distinct from the GNSS receiver, wherein the independent positioning solution is certified to at least ASIL B safety.

10. The system of claim 9, further comprising a second corrections monitor configured to generate a second integrity flag indicative of whether the GNSS corrections achieve the threshold safety based on a residual calculated between a third set of satellite observations and the GNSS corrections; and a corrections combiner operating in at least an ASIL B certified environment, wherein the corrections combiner is configured to:

convert the GNSS corrections and the bounds based on a line-of-sight vector between a GNSS receiver and satellites associated with the GNSS corrections; and match the integrity flag and the second integrity flag to the converted GNSS corrections.

11. The system of claim 10, wherein the second set of satellite observations and the third set of satellite observations are distinct.

12. The system of claim 10, wherein the integrity flag and the second integrity flag each meets or exceeds an ASIL A safety rating, wherein the GNSS corrections meet or exceed an ASIL B safety rating after being matched to the plurality of integrity flags by the corrections combiner.

13. The system of claim 9, wherein the corrections monitor comprises:

a manager configured to network the corrections monitor to an endpoint; and a handler configured to generate the integrity flag, wherein the handler generates the integrity flag in a separate memory region of a processor from the manager.

14. The system of claim 13, wherein the manager and handler both access a shared memory region, wherein data to be shared between the manager and the handler in the shared memory region comprises a payload comprising the GNSS corrections and the second set of satellite observations, a payload size, an operation to be performed on the payload, and a fingerprint of the payload; wherein the handler verifies the payload based on the fingerprint of the payload generating the integrity flag.

15. The system of claim 14, further comprising a sync block that controls access to the shared memory region for the manager and the handler.

16. The system of claim 9, wherein the corrections generator comprises a corrections generator manager and a corrections generator handler, wherein the corrections generator manager and the corrections generator handler are not configured to be free from interference.

17. The system of claim 16, further comprising a reference station observation preprocessor configured to detect outliers in the first set of satellite observations or the second set of satellite observations, wherein the reference station observation preprocessor comprises a preprocessor manager and a preprocessor handler that are configured to be free from interference.

18. The system of claim 9, wherein the corrections generator operates on a first processor and the corrections monitor operates on a second processor separate from the first processor.

* * * * *